(12) United States Patent
Maisotsenko et al.

(10) Patent No.: US 6,705,096 B2
(45) Date of Patent: Mar. 16, 2004

(54) METHOD AND PLATE APPARATUS FOR DEW POINT EVAPORATIVE COOLER USING A TROUGH WETTING SYSTEM

(75) Inventors: Valeriy Maisotsenko, Aurora, CO (US); Timothy L. Heaton, Arvada, CO (US); Alan D. Gillan, Denver, CO (US); Leland E. Gillan, Denver, CO (US)

(73) Assignee: Idalex Technologies, Inc., Arvada, CO (US)

( * ) Notice: Subject to any disclaimer, the term of this patent is extended or adjusted under 35 U.S.C. 154(b) by 0 days.

(21) Appl. No.: 10/316,775

(22) Filed: Dec. 11, 2002

(65) Prior Publication Data

US 2003/0145609 A1 Aug. 7, 2003

Related U.S. Application Data

(63) Continuation-in-part of application No. 09/966,928, filed on Sep. 27, 2001.
(60) Provisional application No. 60/341,206, filed on Dec. 12, 2001, and provisional application No. 60/236,047, filed on Sep. 27, 2000.

(51) Int. Cl.[7] .............................. F28C 1/00; F28D 3/00
(52) U.S. Cl. ........................................... 62/121; 62/171
(58) Field of Search ........................... 62/121, 171, 91, 62/304, 310, 315; 165/164, 165, 166; 261/153, 154

(56) References Cited

U.S. PATENT DOCUMENTS

| | | | |
|---|---|---|---|
| 4,002,040 A | 1/1977 | Munters et al. | 62/121 |
| 5,187,946 A | 2/1993 | Rotenberg et al. | 62/314 |
| 5,212,956 A | 5/1993 | Tsimerman | 62/94 |
| 5,727,394 A | 3/1998 | Belding | 62/94 |
| 6,018,953 A | 2/2000 | Belding | 62/94 |

FOREIGN PATENT DOCUMENTS

RU 1070385 1/1984

*Primary Examiner*—Chen Wen Jiang
(74) *Attorney, Agent, or Firm*—Jennifer L. Bales; Macheledt Bales LLP

(57) ABSTRACT

An improved method and apparatus for indirect evaporative cooling of a fluid stream to substantially its dew point temperature. Plate heat exchanger has perforations (11) and channels (3, 4 and 5) for gas on a dry side and wet side. There is a trough formed in a portion of the plate that temporarily holds evaporative fluid which is in contact with the wick material on the wet side surface of the plate. The evaporative fluid flows through the trough by way of liquid perforations into the next trough. The trough of a plate with a wet side up, the liquid perforations are on the side creating a reservoir to wet the opposing wick materials. As streams flow across the dry side (9), transferring heat to the plate. Working gas stream (2) flows across the dry side and through perforations to channels (5) on wet side (10), which it then cools by evaporative cooling as well as conductive and radiative transfer of heat from plate.

39 Claims, 24 Drawing Sheets

METHOD AND PLATE APPARATUS FOR DEW POINT EVAPORATIVE COOLER USING A TROUGH WETTING SYSTEM

RELATED APPLICATIONS

This application is a continuation-in-part of U.S. patent application Ser. No. 09/966,928, filed Sep. 27, 2001, entitled "METHOD AND PLATE APPARATUS FOR DEW POINT EVAPORATIVE COOLER", which claims the benefit of U.S. Provisional Patent Application Serial No. 60/236,047, filed Sep. 27, 2000, entitled "IMPROVED METHOD AND MEMBRANE APPARATUS FOR DEW POINT EVAPORATIVE COOLER". This application Ser. No. 60/341,206, filed Dec. 12, 2001, entitled "TROUGH WETTING SYSTEM DESIGN".

BACKGROUND OF THE INVENTION

1. Field of the Invention

The invention relates to the field of evaporative fluid conditioning. More specifically, the invention relates to the field of sensible cooling of fluids (gas, liquid or mixtures with and without phase changes) to substantially the dew point for gas by indirect evaporative cooling within a heat exchanger having canalized gas and fluid flows and a lateral temperature gradient across the heat exchange plates. Further the invention herein is directed to an improved membrane design, to aid in quick distribution of liquid, efficient reservoir system and a control system.

2. Discussion of the Background

Indirect evaporative cooling is a method of cooling a gas stream, usually air, by evaporating a cooling liquid, usually water, into a second air stream while transferring heat from the first air stream to the second. The method has certain inherent advantages compared to conventional air conditioning: low electricity requirements, relatively high reliability, and the ability to do away with the need for refrigerants such as R-134 and all the disadvantages they entail. However, indirect evaporative cooling is as yet only used in specially built commercial applications, and is not yet available on the market as a residential or after market product. This is due to certain disadvantages of known indirect evaporative coolers and methods: excessive cost, ineffective thermodynamic cycle that does not allow for enough cooling of air for the expenses involved, ineffective water supply system, scale buildup, poor or expensive heat exchanger, excessive pressure drop, difficulty approaching the dew point of the air stream (the theoretical limit of cooling), relatively high dew points in humid atmospheres, large pressure drops across the heat exchange apparatus, large heat exchange apparatus, and in some designs, reliance on a good deal of ancillary equipment.

U.S. Pat. No. 4,002,040 issued to Munters et al on Jan. 11, 1977 discloses a heat exchanger in which there is no mixing between canalized air streams, and in which the air stream passing through the device is put through a 270 degree turn within the device, resulting in a large pressure drop engendered by the flow path. Additionally, Munters does not allow for cooling fluids other than outside air and cannot be used in applications where recirculation is desired.

U.S. Pat. No. 5,187,946 issued to Rotenberg et al on Feb. 23, 1993, but copies Maisotsenko Russian patent (2096257) discloses a heat exchanger having perforations through the heat exchange plates and alternating wet and dry channels. The present invention is different in substantial ways from the U.S. Pat. No. 5,187,964 disclosure (Maisotsenko Russian Patent 2046257) does not use: a separate treatment of product fluids (cooled fluids, whether gas, as U.S. Pat. No. 5,187,946's disclosure is limited to, or other fluids), the thin plastic plates that operate as efficient heat transfer from dry channels to wet channels yet do not transfer heat laterally along the surface or the plates, or a shallow slope to the heat exchange plates to allow efficient wicking action, but instead discloses a relatively high angle. It also does not reveal use of a feeder wick, or wick, or reservoir system instead using complex and costly spray heads located in each wet channel. Finally, U.S. Pat. No. 5,187,964 argues against the use of channel guides, urging that turbulent flow provides better efficiency. However, this does not allow U.S. Pat. No. 5,187,964 to control the lateral temperature profile of the individual heat exchange plates. In addition in the current invention by separating the working air stream from the product the working air decreases in flow as it passes through the channel perforations, reducing its pressure drop and at the same time allowing better control of the exhaust channels. U.S. Pat. No. 5,187,964, similar to Munters above is limited to cooling outside air.

U.S. Pat. No. 5,170,633 issued to Kaplan on Dec. 15, 1992, shows the amount of ancillary equipment which can proliferate in indirect evaporative systems. U.S. Pat. Nos., 5,727,394, 5,758,508, 5,860,284, 5,890,372, 6,003,327, 6,018,953, 6,050,100, issued to Belding et al and Goland et al, display the same syndrome of excessive air treatment equipment. In examining systems such as those referred to, it should be borne in mind that a single additional heat exchanger adds more than one third to the overall cost of the system. These systems, aside from the different methods again only apply for cooling air.

U.S. Pat. No. 5,453,223, dated Sep. 26, 1995, and nominally issued to the present applicant, discloses an apparatus in which alternating sets of wet and dry plates provide two streams of air: one dry, cooled by contact with the plates beside it, and one wet, cooled by direct evaporation. However, the unit requires two gas flows in and two gas flows out. In addition, the design in question does not provide for indirect cooling only, without additional direct evaporative cooling. While such a second stage of direct evaporative cooling, raising the humidity of the product air, is often desirable, it is as often not desirable.

Two pending applications by the present inventor also address the technology of indirect evaporative cooling. PCT Application PCT/US01/04082, filed Feb. 7, 2001, discloses one method of eliminating a second stage of direct evaporative cooling. PCT Application PCT/US01/04081 filed on Feb. 7, 2001, discloses better methods of design of the heat exchange cores of indirect evaporative coolers, allowing better wetting and reduced pressure drops.

An indirect evaporative method and apparatus providing more efficient air flow and heat transfer is desirable. The advantages of the improved membrane, reservoir and control mechanism of the indirect evaporative method and apparatus grant advantages over the previously disclosed designs yielding more positive results.

SUMMARY OF THE INVENTION

The present invention provides an indirect evaporative cooler of fluids of all types having cross flowing wet and dry channels on opposite sides of a heat exchange plate which allows heat transfer through the plate due to thin plastic construction or other suitable materials but prevents or minimizes heat transfer laterally along the plate. For purposes of application, we wish to define certain terms:

1. Heat transfer surface or heat exchange surface has many configurations. All are encompassed within the subject of this disclosed invention with appropriate adjustment to the wetting and flows as are well known in the industry. For the example of the illustration we make use of a plate configuration.
2. Wet side or portion of the heat exchange surface means that portion having evaporative liquid on or in its surface, thus enabling evaporative cooling of the surface and the absorption of latent heat from the surface.
3. Dry side or portion of the heat exchanger means that portion of the heat exchanger surface where there is no evaporation into the adjacent gas or fluid. Thus, there is no transfer of vapor and latent heat into adjacent gases. In fact, the surface may be wet but not with evaporative fluid or wet by condensation, but no evaporation exists.
4. Working stream or working gas stream is the gas flow that flows along the heat exchange surface on the dry side, passes through the passages in the surface to the wet side and picks up vapor and by evaporation takes latent heat from the heat exchange surface and transports it out into the exhaust. In some embodiments, the working stream may be disposed of as waste and in others it may be used for special purposes, such as adding humidity or scavenging heat.
5. Product stream or product fluid stream is the fluid (gas, liquid or mixture) flow that passes along the heat exchange surface on the dry side and is cooled by the absorption of heat by the working gas stream on the wet side absorbing latent heat by the evaporation in the wet area.
6. Trough wetting system embodiment is a feature of the membrane that on the illustrations occurs in all membranes in a central area of the membranes and the troughs of adjacent membranes work in conjunction as liquid passage ways and as holding locations or reservoirs for purposes of wetting the wet side of the membranes. The location and shape, and relative placement of this trough or trough like features are merely depictions. Other orientation and methods and apparatus are encompassed within the disclosed invention.

The plate also has passageways or perforations or transfer means between the dry side of the plate and the wet side in defined areas providing flow from the dry working channels to the working wet channels in which direct evaporative cooling takes place. By means of the perforations the working gas streams have a pressure drop through the system, which is reduced.

The method of the invention makes use of the separation of a working gas flow (that is used to evaporate liquid in the wet channels and thus to cool the wet surface of the heat exchanger plate) from the product fluid flow, both flowing through dry product channels and dry working channels on the same side of the heat exchange plate and that both give up heat to the heat exchange plate that on its obverse surface is being cooled by evaporation in the working wet channels.

The working gas flow first enters the dry working channel and then through perforations, pores or other suitable means of transfer across the barrier of the plate to the wet side and thence into the wet working channels where evaporation of liquid on the wet channel surface, cools this plate.

The dry product channels are on the dry side of this plate. The plate is of a thin material to allow easy heat transfer across this pate and thus to readily allow heat to transfer from the dry product channel to the wet working channel. This is one basic unit or element of the invention illustrating the method of the separation of working gas flows to indirectly cool the separate product fluid by evaporative cooling.

It is therefore on object of the invention to provide an indirect evaporative cooler having perforations allowing flow from dry working channels to wet working channels on the opposite side of the heat exchange plate.

It is another object of the invention to provide an indirect evaporative cooler having heat exchange plates, which do not allow substantial lateral heat transfer but do allow heat exchange through and across the plate. This produces a temperature transfer across the plate that is not averaged out by lateral heat transfer down the plate. Averaging the temperature down the plate would effectively reduce the temperature difference through and across the plate and results in lower heat transfer rates across the plate. Thus, it is part of this invention to have heat readily transfer across the plate from the dry side to the wet side but not readily transfer along the surface of the plate.

It is another object of the invention to provide an indirect evaporative cooler having a temperature gradient across the two dimensional surface of the plate, and thus providing working gas stream channels having a range of temperatures.

It is another object of the invention to provide an indirect evaporative cooler allowing selection of the product fluid streams for use in cooling, in particular, the fluid streams exiting from the coldest product channels may be selected for use in cooling. Conversely, the selection may be of some portion of the working gas streams to give added humidity to the environment.

It is another object of the invention to provide an indirect evaporative cooler having efficient wicking action allowing easy wetting of substantially all of the surface area of the wet channels with out excess water that cools the water rather then the air.

It is another object of the invention to provide an indirect evaporative cooler having a system providing liquid uniformly to all wet channels of the device. The system has features to quickly distribute the liquid to all wet membranes, to provide reservoirs for wetting and a control system to adjust and control the liquid distribution.

It is yet another object of the invention to provide an indirect evaporative cooler having cycle selection means, so that during summer months, it may be used to provide cooled, non-humidified air, and during winter months, it may be used to scavenge heat from gases exiting a space while simultaneously humidifying the space.

It is yet another object of the invention to provide an efficient indirect evaporative cooler, allowing cooling of a stream of a product to substantially the working gas dew point temperature.

It is another object of the invention to provide an efficient indirect evaporative cooler having a relatively small pressure drop for working gas streams.

DETAILED DESCRIPTION OF THE INVENTION

Figure 1A:
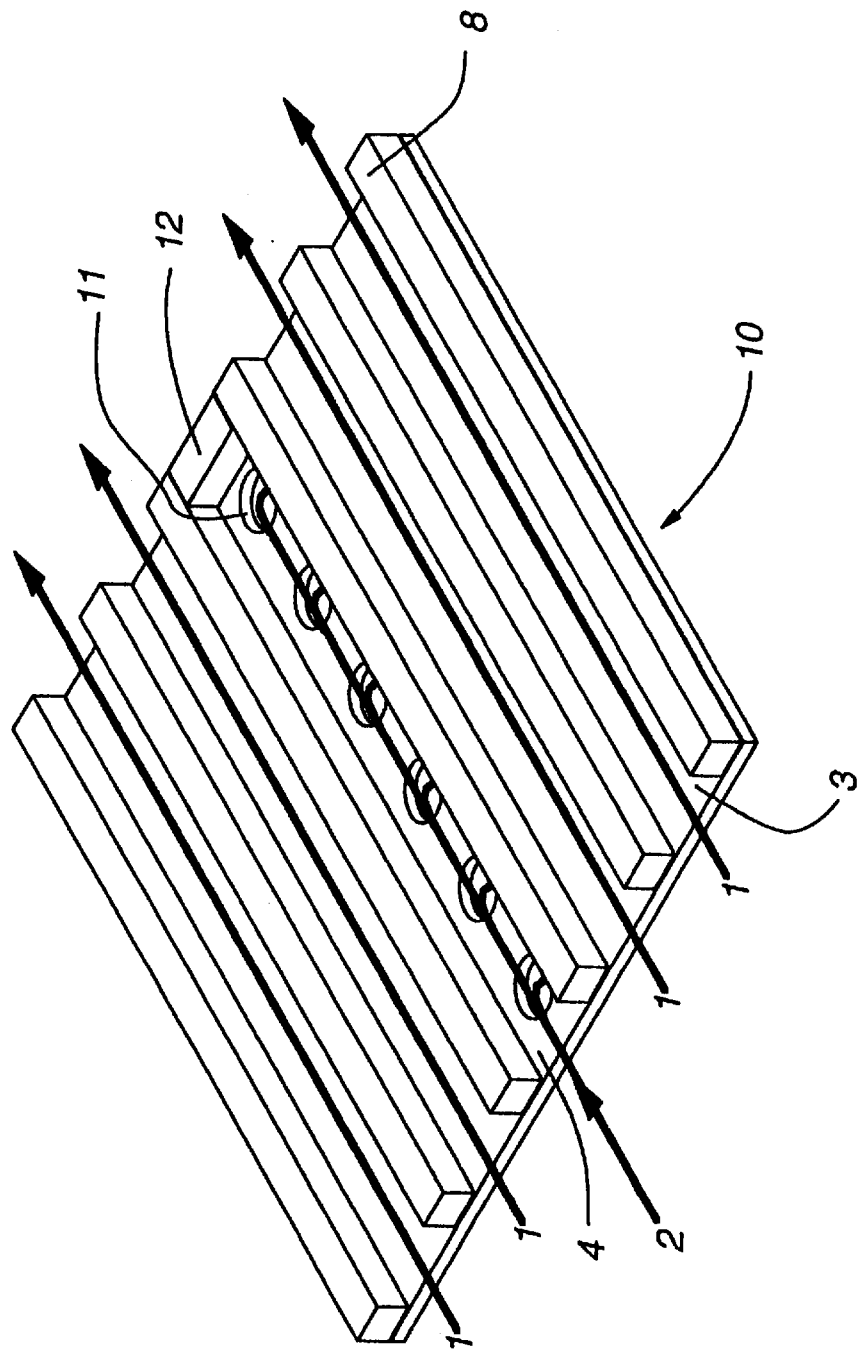
FIG. 1(a) is a three dimensional perspective and schematic representation of a first embodiment of the invention method, showing the gas flow path of the working gas for cooling of the gas in passing through a perforation or passage from a dry side of a plate to a wet side of the plate. The dry side of the plate has separators to keep the working gas path separate from the product fluid path.
Figure 1B:
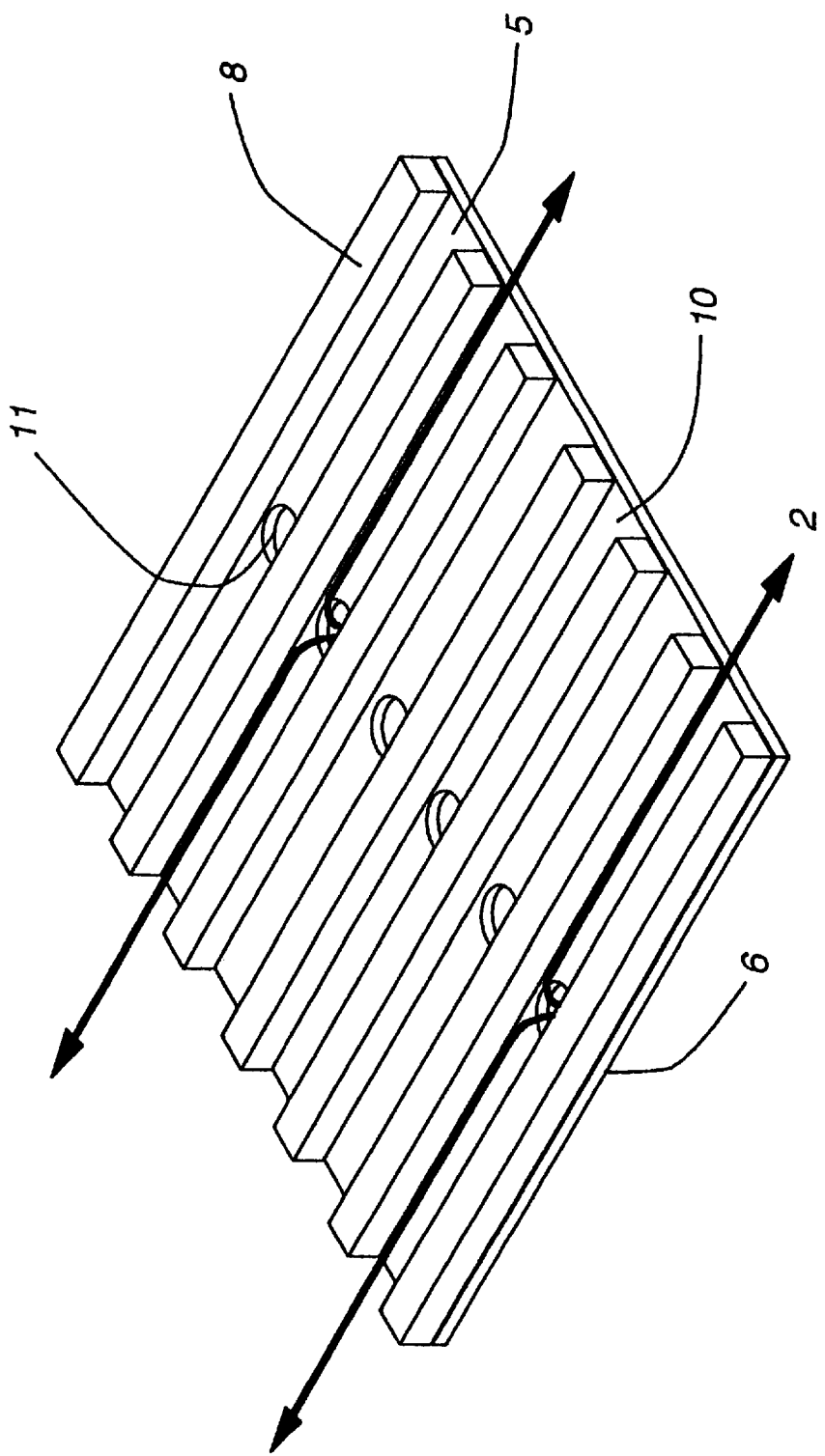
FIG. 1(b) is a perspective and schematic representation of the obverse side of FIG. 1(a) showing the wet side with channels and depicting the working gas flow after it goes through the passages and then along the wet surface of the channels where evaporation occurs.
Figure 1C:
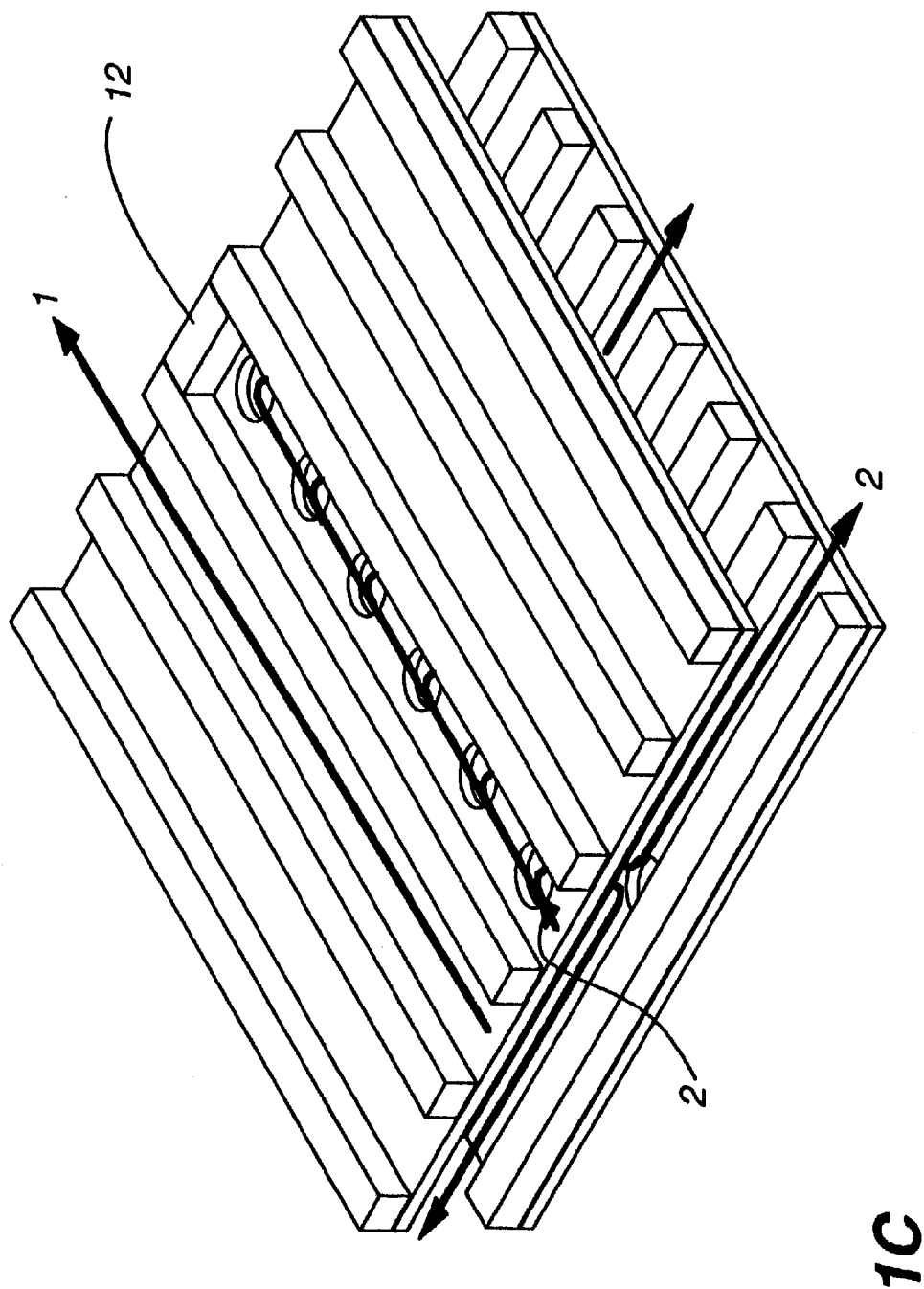
FIG. 1(c) is a perspective and schematic representation of two plates, such as in FIGS. 1(a) and 1(b) showing the wet side channels formed by the wet sides of a first and a second plate opposing each other, with their passages oriented in the same general area and illustrating the working gas entering on the dry side, passing through the passages and into the wet side channels. The product fluid is separated from the working gas as they pass along the dry side of the first and second plates. Additional plates would have adjacent plates having their dry side oppose the dry sides of these first and second plates. Thus, the stack of plates would have every odd plate oriented with its dry side facing the same direction and opposite of all even plates.

Figure is a three dimensional perspective and schematic representation of an embodiment of a primary element of the invention demonstrating the method by which indirect cooling occurs. This element embodiment is formed as a flat plate (and thus also referred to herein as plate 6), includes perforations 11 which connect dry side 9 to wet side 10. Dry side 9 is further subdivided and segregated into product channels 3 and working gas channel 4: perforations 11 are within working gas channel 4. Wet side 10, see FIG. 1b, is wetted with an evaporative liquid to provide cooling. Wet side 10 also has channel 5. Channels 3 and 4, FIG. 1a, are segregated so the working dry gas is kept separate from the dry product fluid. Channel guides 8 define channels 3 and 4 by preventing intermixing of the gas between the channels 3 and 4 and relatively freely transfer across plate 6 from the perpendicular gas streams on the other side. As the plate 6 is very thin, heat may readily pass perpendicular through and across this plate from the dry side to the wet side. The plate material is selected to minimize heat transfer along the plate. A preferred material is plastic. The materials of the channel guides aside from providing barriers to define channels may also advantageously insulate the streams as much as possible from the adjacent parallel streams on both sides, thus offering a low rate of "parallel heat transfer".

In use, a product stream of fluid 1 and a working stream of gas 2 are respectively drawn into channels 3 and 4, traversing the dry side of plate 6 in a laminar flow. Working gas stream 2 then flows through perforations 11 to the wet side 10 and into channels 5. Channels 5 on the wet side directs gas stream 2 in a direction somewhat perpendicular to perpendicular to the fluids flowing on the dry side and across the wet side 10 of plate 6, where it receives heat in several ways: first, in the form of evaporation of liquid from wet side 10 and second, as heat rejected by conduction and radiation from plate 6. Thus plate 6 acts as a heat exchanger and as an indirect evaporative cooler. Gas flow 2 emerges from the indirect evaporative cooler 6 as gas streams 2, as indicated in FIG. 1(a) and FIG. 1(b).

The cross flow need not be exactly perpendicular, as long as the flow is "substantially somewhat perpendicular". At 180 degrees, the flow becomes a counter flow, and at 0 degrees, the streams on both sides of plate 6 may be parallel. A substantially somewhat perpendicular flow may occur at an angle between these two extremes, provided the angle allows the streams on opposite sides of the plate to cross each other. The importance of having the streams on opposite sides of plate 6 is that this provides a temperature gradient and temperature differential discussed later.

In this embodiment all of working gas stream 2 passes over the center of the plate 6 in channel 4. On the obverse side of plate 6, under channel 4, gas stream 2 is in contact with the wet side and is cooled by evaporation. At the inlet, stream 2 (on the dry side in channel 4) is being cooled by the evaporation on the obverse side of plate 6. This acts as precooling of stream 2. Thus as stream 2 proceeds down channel 4 on the dry side before entering perforations 11, it's dry cooled to ideally the wet bulb temperature. This precooling in the dry side, allows this stream to enter the wet side cooler than its original temperature therefore with a continuing lower wet bulb temperature.

The canalization of the gas streams 1 and 2 further increases the efficiency of the device by allowing control of the flow within it and control of temperature. The temperature differential through and across the plate 6 is generated by the flow of gas stream 2 through the wet channels 5; at the start of the flow of gas stream 2 through the wet channels 5, it is very dry and can absorb the maximum of vapor from the evaporative fluid. This in turn absorbs the maximum amount of latent heat (transition from liquid to vapor), which in turn allows for the greater temperature differential through the plate 6. Thus channel 3 nearest the channel 4 will be cooled the most.

In practice the product fluid may be any fluid (air, gas, liquid or mixed) for which dry cooling is desired, that is, cooling without addition of a partial pressure gas component derived from evaporation of the cooling liquid. For example, in commercial and residential usage, the fluid may be air and the cooling liquid water: the product air streams that emerge from the dry side channels invention do so without having any humidity added. It can be refrigerants, either during phase changes or not, to allow for cooling to lower temperatures before use and thus achieve greater efficiencies in the refrigerant cycle at low cost.

In the embodiment pictured, in FIG. 1(a), the segregation of the working dry gas from the product fluid may be by channel guides 8 that act as walls between adjacent plates. In the end of channel 4, a barrier or wall 12 prevents the working dry gas from exiting and mixing with the product fluid. If plate 6 is corrugated, the channel guides are partially provided by the corrugations in the plate itself. The channel guides would be present on either or both sides of plate 6 and between the product fluid and working gas to prevent passing of fluids between the corrugations of the opposite plate. In either case, they function to channel the gas or fluid streams, and may also advantageously maintain the separation of plate 6 with other plates, in those embodiments having more than one heat transfer plate. In addition corrugated channel guides may be used in between flat plates 6, in which case no additional separation is needed.

Wet side 10 of plate 6 may advantageously include a wick layer material capable of transpiring the cooling liquid across wet side 10. Preferably, the wick layer may cover substantially the entire surface area of wet side 10. The wick layer may comprise any of a number of well known materials: cellulose, organic fibers, organic-based fibers, porous plastics, carbon-based fibers, polyesters, polypropylene, fiberglass, silicon-based fibers and combinations of these substances. The wick layer material may be in a number of forms: films, weaves, braids, beds of particles such as beads and combinations thereof.

Advantageously, the wick layer material may be the material of plate 6. For example, plate 6 may be a wick layer material treated on one side to make it impermeable, the impermeable side then being used as the dry side of plate 6. The treatment may consist of changing the nature of the wick layer material itself, or coating it with another substance such as a plastic film or equivalent. The wick layer material may be treated to be of low permeability instead of being entirely impermeable. In this application, "low permeability" means that the amount of water allowed through plate 6 to dry side 9 is small enough that the gas streams crossing dry side 9 do not become substantially humidified and are not substantially cooled by evaporation. Substitution of a low permeability dry side for an impermeable dry side nonetheless allows practice of the invention as claimed herein.

Alternatively, the material of plate 6 may be impermeable and treated to render it permeable or to wick on the wet side 10. In either case, the material of plate 6 should have a relatively high resistance to heat transfer. While this has almost no effect on heat transfer through plate 6, because it is thin, heat cannot be transferred laterally across the plate, as discussed earlier.

Plate 6 may also receive its cooling liquid from a feeder wick, as will be discussed below in reference to other embodiments.

Perforations 11 may advantageously be round or other shapes having no corners, or shapes such as polygons with rounded corners not only to increase the durability of the plates but also in order to help prevent turbulence in gas stream 2 as it is passing there through. By preventing turbulence, the pressure drop across the indirect evaporative cooler may be minimized, with corresponding increases in efficiency of operation and reduction in construction costs. The perforations may be passages, such as micro pores, rather than perforation.

Plate 6 may advantageously slope so as to prevent accumulation of excess water, and/or to allow a lower edge of plate 6 to sit in contact with a supply of the cooling liquid, such as a water reservoir, whereby the wicking material may act to keep wet side 10 supplied with cooling liquid. By keeping the slope quite low, from approximately −10 degrees to approximately +10 degrees, the transpiration of liquid across wet side 10 is rendered much more efficient. At greater angles of slope, the maximum wicking height of the wicking material unduly limits the width of the plates. In extreme cases, transpiration may be rendered inefficient or impossible, thus reducing the amount of evaporative cooling achieved due to an inadequate supply of cooling liquid to evaporate. Depending on the nature of the wick layer material, the wick may not transport liquid to the entire wet side 10, leaving some areas dry, or it may leave some sections surface dry but without enough liquid for efficient evaporation to create high levels of relative humidity in the working gas stream. Thus a low angle provides considerably more efficient wicking, and for a given maximum wicking height, allows greater width.

Figure 7:
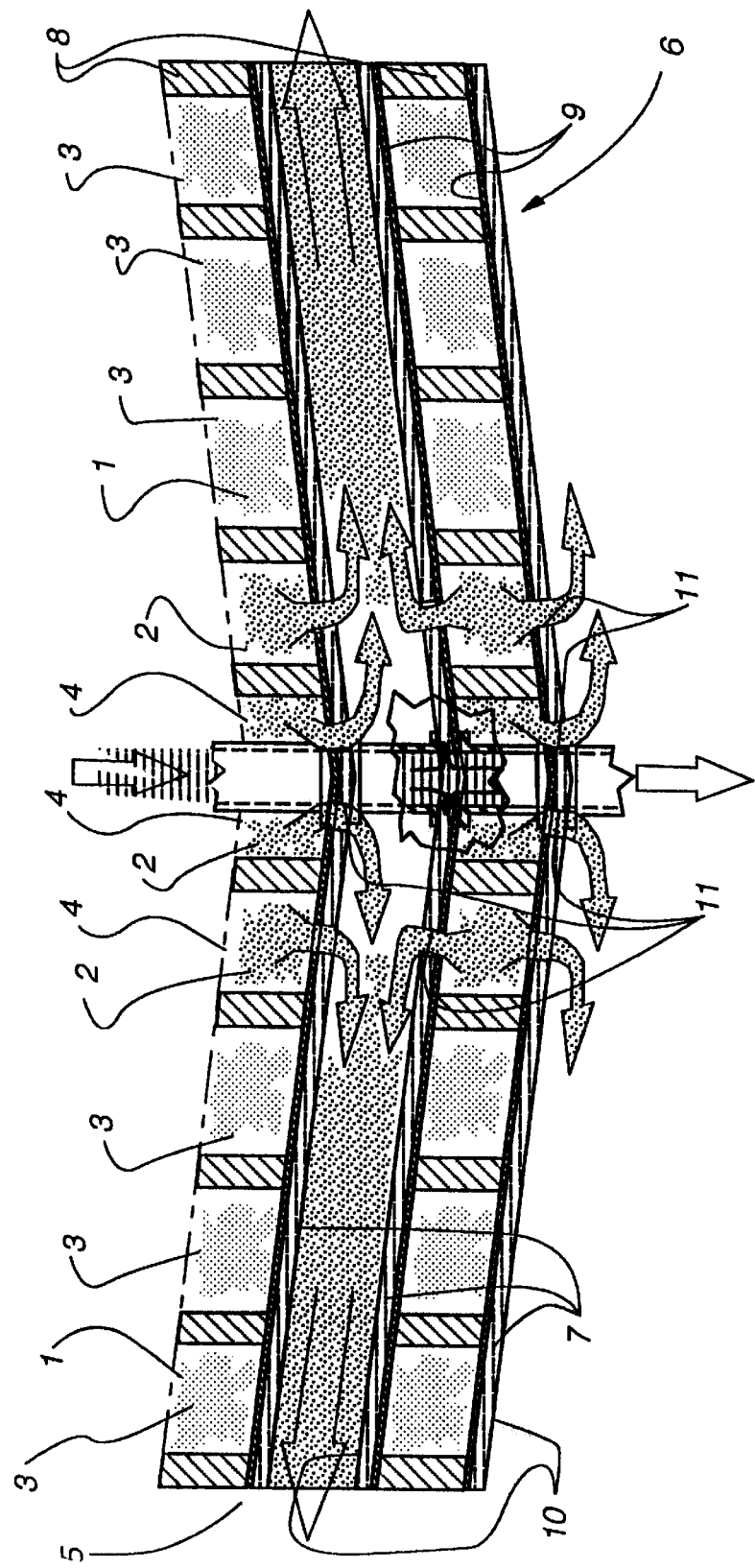
FIG. 7 is a cross-sectional view of the assembly of FIG. 5 with additional plates, showing gas flow with the side wings being angled upward from the mid point. The plate on top has its dry surface. The bottom of this plate is wet and the channel guides orthogonal to the dry side channels. The second plate has its wet surface facing the first plate's wet surfaces making the channels between the first and the second plate wet. The second plate has its dry surface on the bottom. Successive plates continue to match dry to dry surface, and wet and to wet surfaces.
Figure 8:
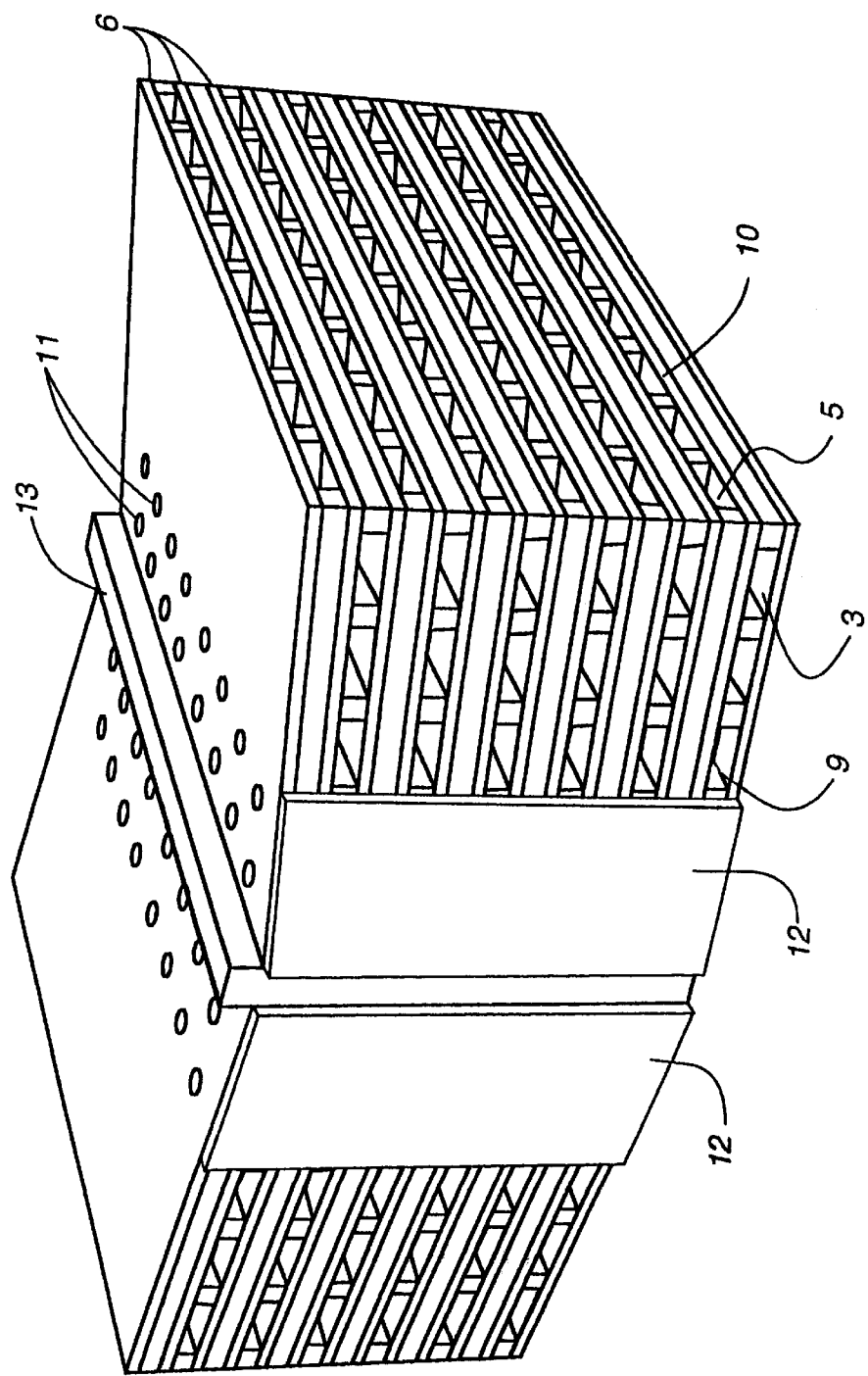
FIG. 8 is a perspective view of a two sided core with a feeder wick plate between the two sides and the upward angled wings orientation of the core layers from the center.

Plate 6 may also have a double-sloped "V" cross-section as is illustrated in FIG. 7 and FIG. 8, that is, plate 6 may in cross-section resemble a shallow valley with a median section lower than two opposing edges or wings. The two slopes may be of different lengths or angles of slope, or may differ in nature of wick layer material or other factors.

Plate 6 may also be equipped with a "stream selection damper" (not shown), allowing selection of only the coldest gas streams from the dry side of plate 6 (i.e. those also it may include damper to select some humid working gas to add humidity to the environment to the center of the plates), or all of the gas streams, or some intermediate selection. By allowing only the coldest streams to be used for cooling, a smaller but colder gas flow is provided; use of a larger selection of the gas streams provides a larger gas flow. Also the damper may select humid working gas for use in humidifying an environment.

Figure 1D:
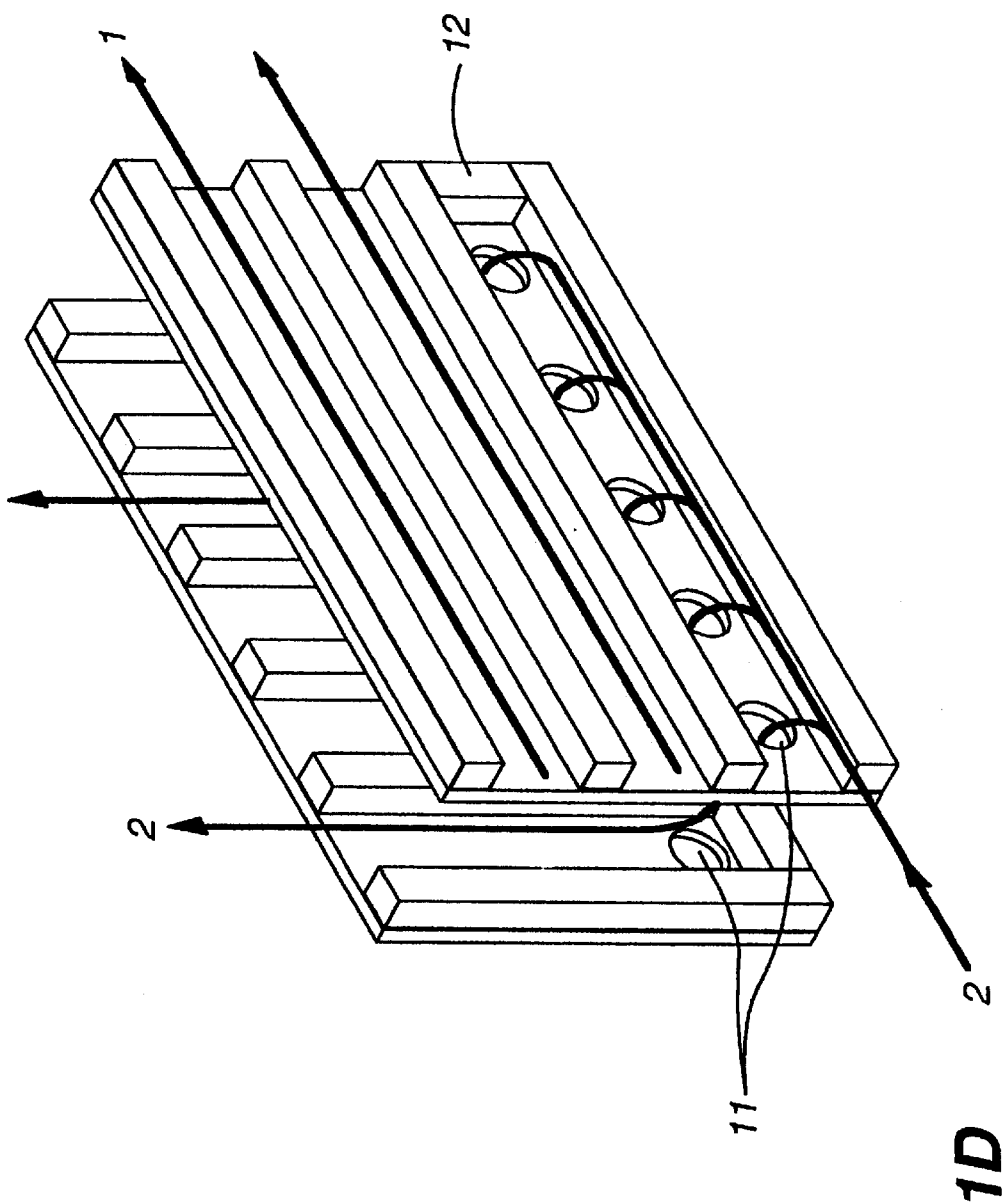
FIG. 1(d) is a three dimensional perspective and schematic representation of a second embodiment of this aspect of the invention, showing a working gas flow path from the segregated working dry path entering the wet side by perforations or passages and exiting one side of the plate after passing across the wet surface of the wet surface of the wet working channel.

FIG. 1*d* is a three dimensional perspective and schematic representation of a second embodiment of the element of the invention. In this embodiment, plate 6 has perforations 11 along one side rather than down the middle, as in the previous embodiment. Channel guides 8 create channels 3 and 4. In this embodiment, channel guides 8 are ribs, but they may be other types of guides, as previously discussed. Channel guide 8 also serves to prevent flow of gases off of one edge of plate 6. Working gas stream 2 flows in channel 4, product stream 1 flows in channel 3. Gas stream 2, the working gas, flows through perforations 11 to channel 5 (not visible), and then flows across the obverse side of plate 6 to depart plate 6 as gas stream 2.

Figure 2:
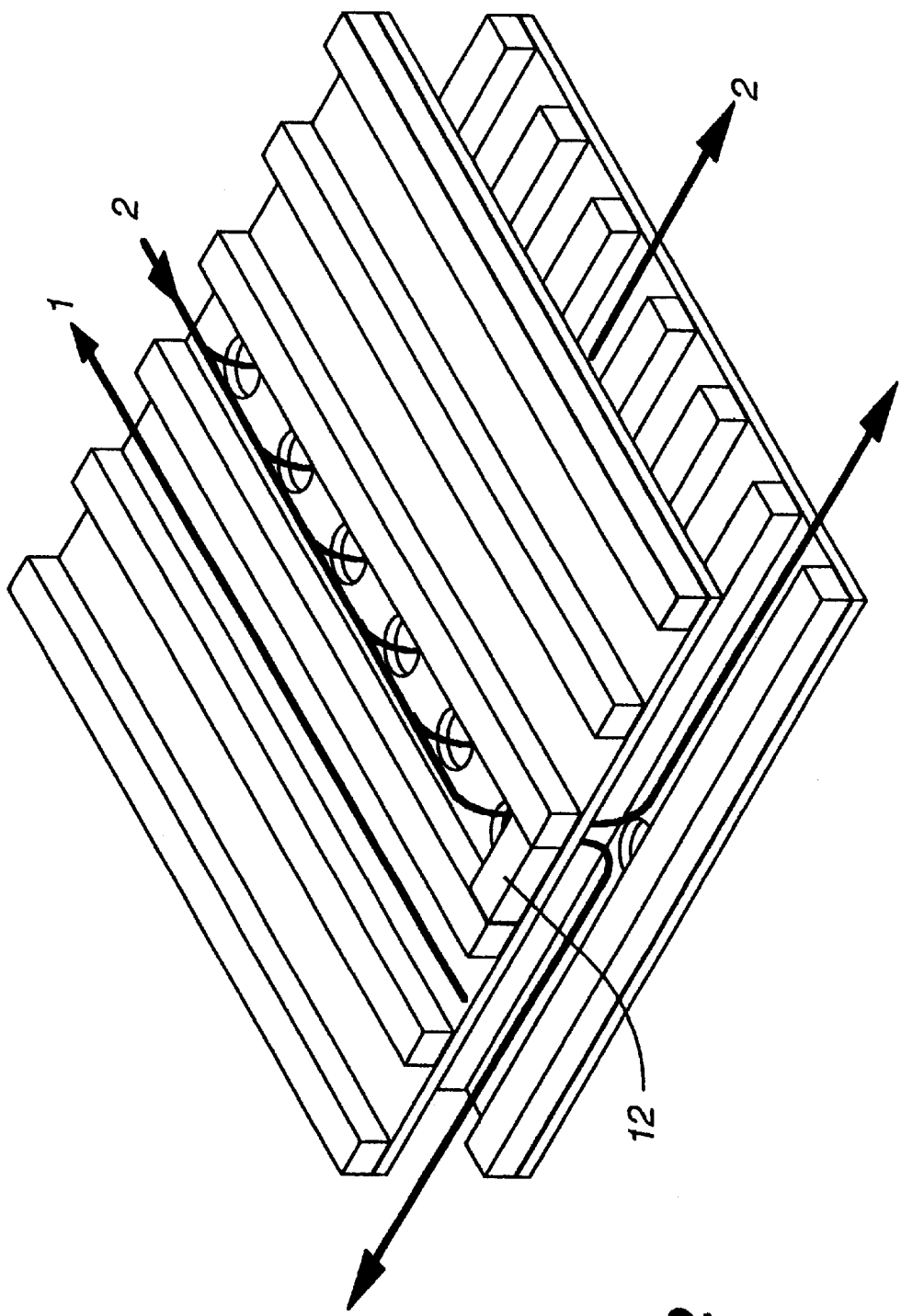
FIG. 2 is a three dimensional perspective and schematic representation of a third embodiment of this aspect of the invention, showing the gas flow path when the invention is used to warm and humidify an air stream.

FIG. 2 is a three dimensional perspective and schematic representation of a third embodiment of the invention, showing the gas flow path when the invention is used to warm and humidify an air stream with water. Thus, in this embodiment and those following, the gas steams may be referred to as air streams, and the cooling liquid will be assumed to be water. In winter months, it is advantageous to exchange heat between exhaust air leaving a warmed space and cold fresh air being brought in from the atmosphere, i.e. the out door air or other source of environmental air. This reduces the heat required to warm the fresh air. The present invention also allows the addition of humidity to the fresh air, thus addressing another winter problem: cold outside air that has condensed moisture out and therefore has a low absolute humidity or extremely dry air that results in dry inside air as the moisture on the inside reduces with fresh air changes with the outside. The "cycle selection" as to which stream of air is exhausted to the atmosphere, and which goes to the space to be conditioned, is a feature of embodiments having this arrangement.

In FIG. 2, Plate 6 has dry side 9, wet side 10, channel guides 8, and perforations 11. Air steam 1 exits the conditioned space as air streams. Meanwhile, fresh air 2 enters and flows through perforation 11. As in the two previous embodiments have shown, plate 6 acts as a heat exchanger to remove heat by conduction from air stream 1, on dry side 9. On wet side 10, air stream 2 flows through channels on the wet side (not visible) and other parallel channels, receiving both heat (via conduction and radiation) and humidity (via evaporation) from wet side 10. Wet side 10 may have a wick material, as discussed previously, and the construction of plate 6 regarding permeability, materials, treatments, feeder wicks, channel guides, corrugations, perforations, stream selection dampers, etc, may also be as previously discussed. In this manner, energy already used to heat air stream is conserved while humidity is added to the fresh air stream 2.

A "cycle selection damper" (not shown) provides the ability to switch between the cooling cycle and the warming/humidification cycle. At the simplest, the cycle selection damper may simply be used to select which stream of air is passed to the space to be conditioned: the air which passes only across the dry side 9 or the air which passes across both dry side 9 and wet side 10. The damper may also provide different sources for the air streams 1 and 2, as will be obvious to those skilled in the art.

Figure 3:
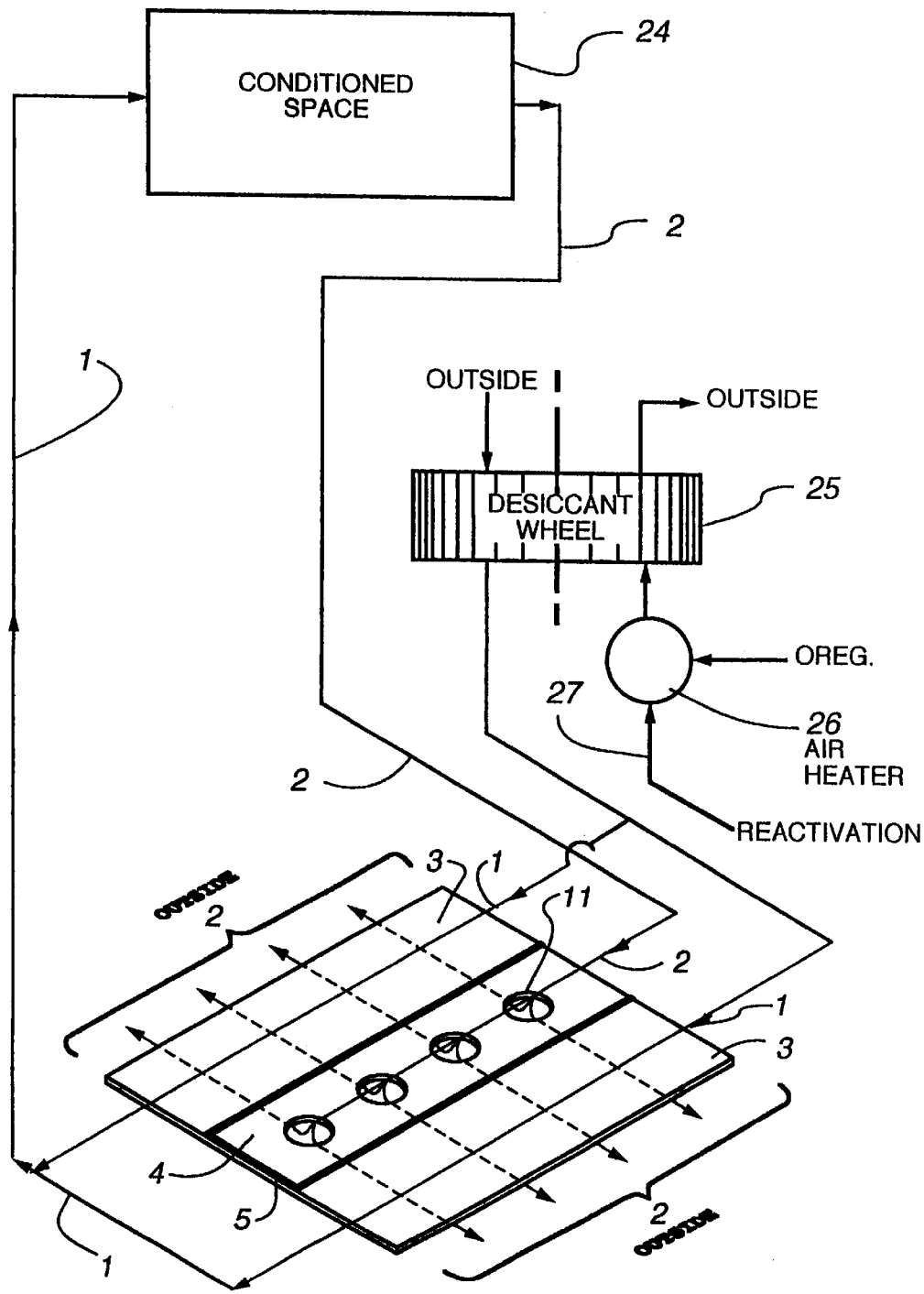
FIG. 3 is a partially three dimensional perspective and schematic representation of the flow path of a fourth embodiment of this aspect of the invention showing the working gas flow when the invention is used for cooling of a dehumidified product fluid, and further showing the product fluid flow in the context of use.

FIG. 3 is a partially three dimensional perspective and schematic representation of the flow path of an embodiment of the invention in an assembly showing the gas flow when the invention is used for cooling, and further showing the gas stream in the context of use. In this embodiment, one gas stream is air from a conditioned space. Since that air frequently emerges from the conditioned space cooler and dryer than outside air or cooler than desiccated air, it can profitably be used as the working stream in the evaporative cooler of the invention.

Indirect evaporative cooler plate 6 comprises channel guides, a plurality of perforations (collectively numbered 11 for convenience). Dry product air stream 1 is provided by a desiccation wheel 25 and enters channels 3 on the dry side. Flowing across plate 6 on the dry side, it transfers heat to plate 6, emerging cooler but without added humidity. Air emerges from conditioned space 24 as working air stream 2, which flows into indirect evaporative cooler plate 6 in channel 4, where it again transfers some heat to plate 6 by conduction before it passes through perforations 11 into the channel on the wet side. On the wet side of plate 6, air stream 2 is cooled by evaporation and simultaneously cools plate 6 by the same action, before being expelled as air streams 2.

Desiccant wheel 25 may contain a liquid or solid desiccant of known type. The desiccant within desiccant wheel 25 must be recharged, that is, must have the water it has absorbed from air stream 1 removed. This is accomplished by reactivation air 27, which flows through air heater 26 before entering desiccant wheel 25. The high temperature of reactivation air 27 removes from the desiccant humidity absorbed from air stream 1. An additional heat exchanger may be used to transfer heat from air stream 1, after it has been heated and dried by flowing through desiccant wheel 25, to reactivation air 27, before air heater 26 heats it, this technique is known in the art. However, it will be appreciated that neither the present embodiment nor the presently preferred embodiments described below use such an additional heat exchanger, as the present invention provides highly efficient cooling to near dew point temperatures, while the additional heat exchanger adds over 45 percent to the cost of the overall system.

Figure 4:
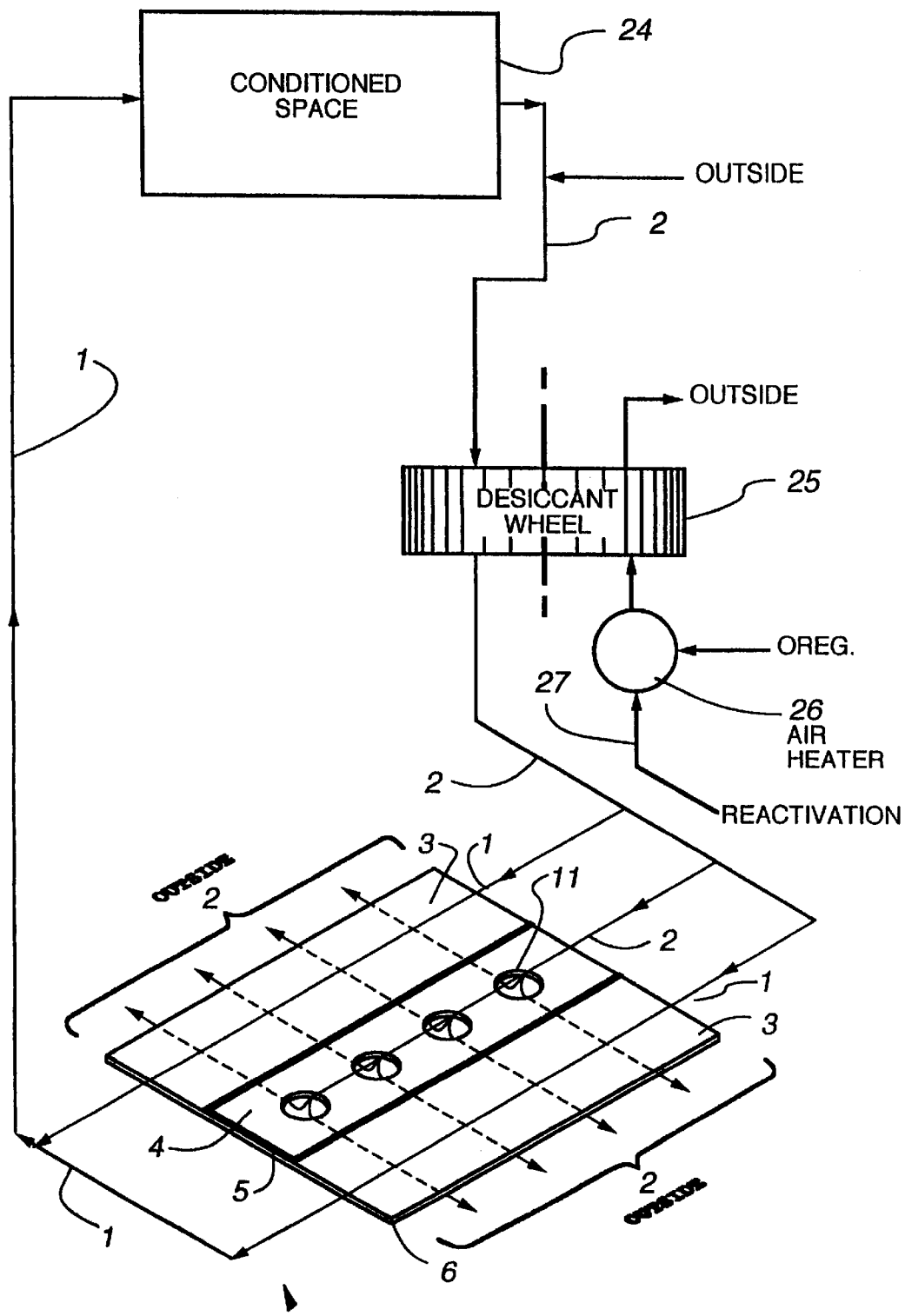
FIG. 4 is a partially three dimensional perspective and schematic representation of the flow path of a fifth embodiment of this aspect of the invention showing working and product gas flow when the invention is used with recirculating gas flow, and further showing the gas flow in the context of use.

FIG. 4 is a partially three dimensional perspective and schematic representation of the flow path of a fifth embodiment of the invention showing the gas flow when the invention is used with recirculating gas steams, and further showing the gas flow in the context of use. In this embodiment of the invention, air from a conditioned space is cooled again and returned as the product fluid. This results in a saving of energy and additional cooling of the product air stream.

Plate 6 has channel guides, channels, and a plurality of perforations collectively numbered 11. Air stream 1 emerges from desiccant wheel 25 before passing over the dry side of plate 6 in channels, where it transfers heat to plate 6 by conduction. Air stream 1 is then passed to conditioned space 24 and eventually recirculated to desiccant wheel 25.

Channel guides segregate working air stream 2 from product air stream 1 after desiccant wheel 25. It passes through channel, where it rejects heat to plate 6 and flows through perforations 11 to the wet side of the plate. As in previous embodiments, wet channel is not visible, but arrows indicating working air streams show that there may be a plurality of wet side channels. At this time, working air streams 2 absorb heat from plate 6 by evaporation, radiation and conduction, cooling plate 6.

Figure 5:
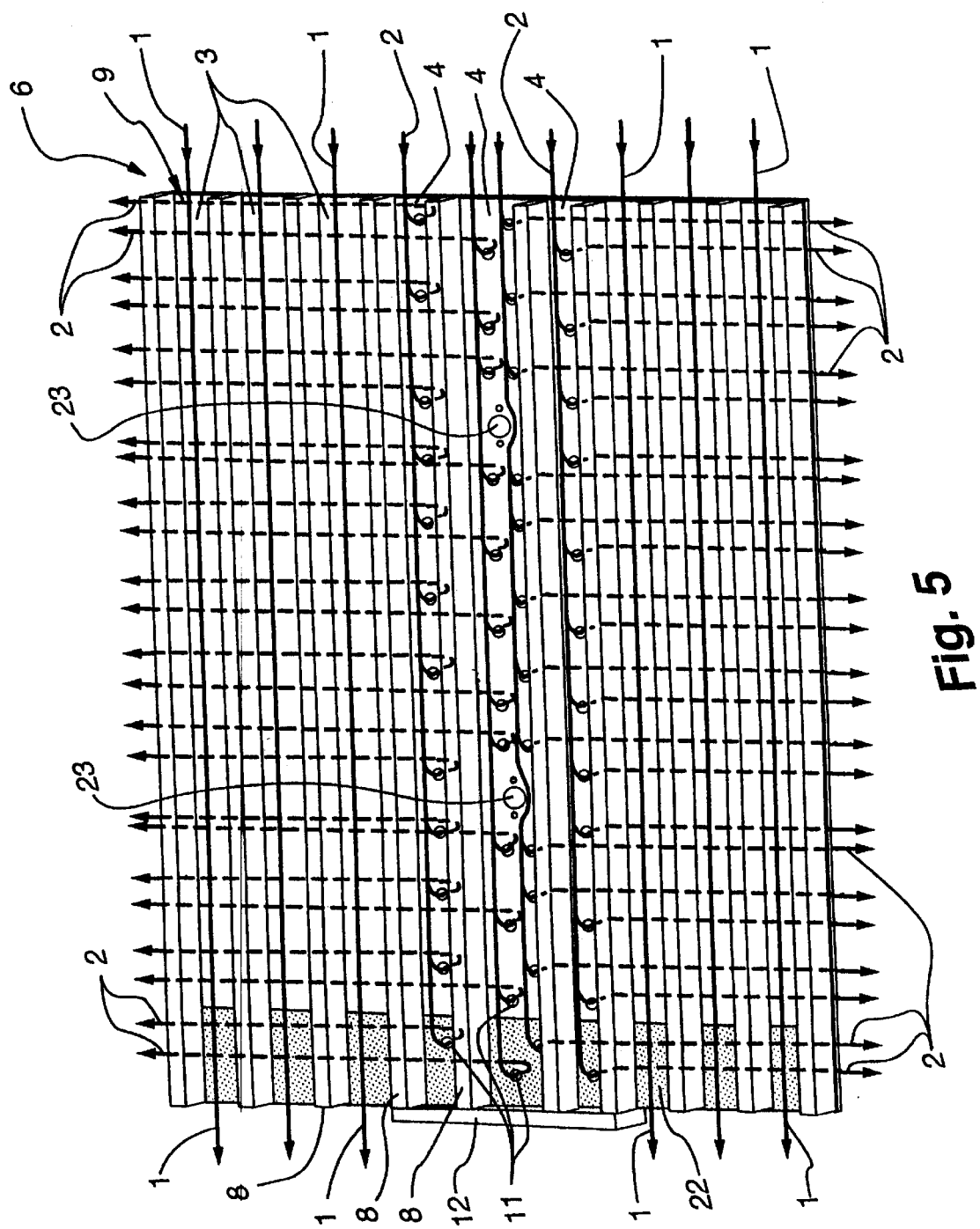
FIG. 5 is a three dimensional perspective and schematic representation of an expanded assembly of multiple channels, showing dry side flow, additional perforations, and additional channel guides with the perforations predominately in the middle of the membrane. The dry working gas enters and passes through the passages to the wet side (not shown).
Figure 6:
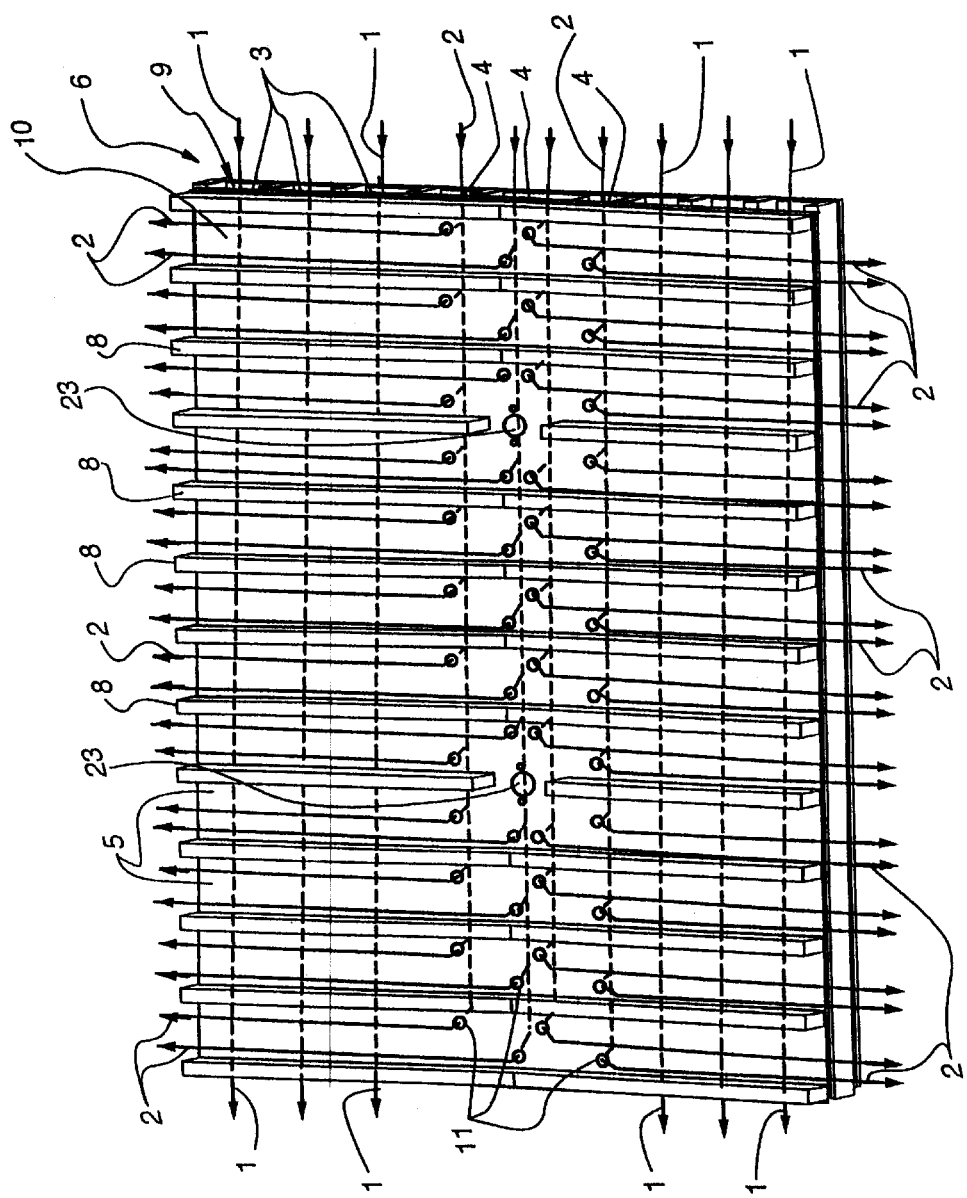
FIG. 6 is a three dimensional perspective and schematic representation of the same expanded assembly of FIG. 5, showing wet side gas flow after the dry working gas passed through the passages. The surface of the plate has wicking material to carry liquid from the feeder wick method to the edges of the plate and to supply the liquid for evaporation cooling.

FIGS. 5 and 6 are three dimensional perspective and schematic representations of a large plate containing the elements of the invention, showing dry side gas flow, wet side gas flow, through channels not shown but present on the obverse side, additional perforations, and additional channel guides, while FIG. 7 is a cross-sectional view of FIG. 5, showing gas flow on the wet side.

Evaporative cooler has product gas streams, working gas streams, product channels, working channels, wet side channels, wick material, channel guides, dry side, wet side, perforations, block, and feeder wick holes.

In use, working gas or product fluid streams respectively flow into channels 4 and 3, transferring heat to the heat exchanger without increase in humidity. Working gas stream flows through perforations into wet side channels 5. FIGS. 7 and 8 show that evaporative cooler comprises a plurality of plates (the three diagrams respectively show one FIG. 5, two and three plates FIG. 7, but the number of plates is not limited to this range FIG. 16). The plates may be "identical" in the sense of having channels on both sides cooperating with perforations 11 to allow gas streams to flow through the plates, being composed of materials having a poor lateral heat transfer rate and being impermeable on one side, with dry sides opposing each other across the plate spacing and wet sides opposing. The plates of the invention may also be dimensioned and configured to embody the invention without being identical. The plates are aligned in parallel and have like sides facing. In this application, "like sides facing" refers to the fact that wet sides face the wet sides of other plates while dry sides face other plates. It does not refer to the placement of perforations 11, which will be discussed further below.

In wet side channels, air stream receives heat from the plates of evaporative cooler 6 by the mechanisms previously described. Also as noted earlier, working gas stream 2 is itself pre-cooled by its passage across the dry side of the plates of the evaporative cooler 6 in channel 4, resulting in further cooling action by the device of the invention. Further as noted earlier, the gas streams may be selected based upon heat rejection (coolness) for service either as product or working air or with or without humidity. Thus, block 12 seals the end of channels 4, requiring all of air stream 2 to flow through perforations 11 to the wet side channels. Under different conditions, some of air stream 2 may be allowed to leave the end of channel 4 by removal of block 12, resulting in a greater volume of slightly less cool product air, or in the alternative, some of air stream 1 may be diverted or blocked (that portion of air stream 1 which was furthest from the center of evaporative cooler 6 and thus received the least cooling), thus producing a smaller quantity of slightly cooler product air. Other alternatives for the construction of the invention are also as described earlier.

Thus, air streams in this assembly flow between two plates rather than across one plate. If two such plates are aligned with dry sides facing, then the air streams flow between the two plates on the dry sides, if the wet sides are facing, the air streams flow between the plates on the wet sides. In embodiments having more than two plates, air streams will first flow between the dry sides of two plates, then will flow through one or both plates and enter wet channels, in which they will flow across one of the two previous plates (on the reverse side) and the wet side of a third plate.

In one embodiment feeder wicks may pass through feeder wick holes 23 in order to supply water to wick material 7, and will be discussed with reference to FIGS. 8 and 9.

Figure 9:
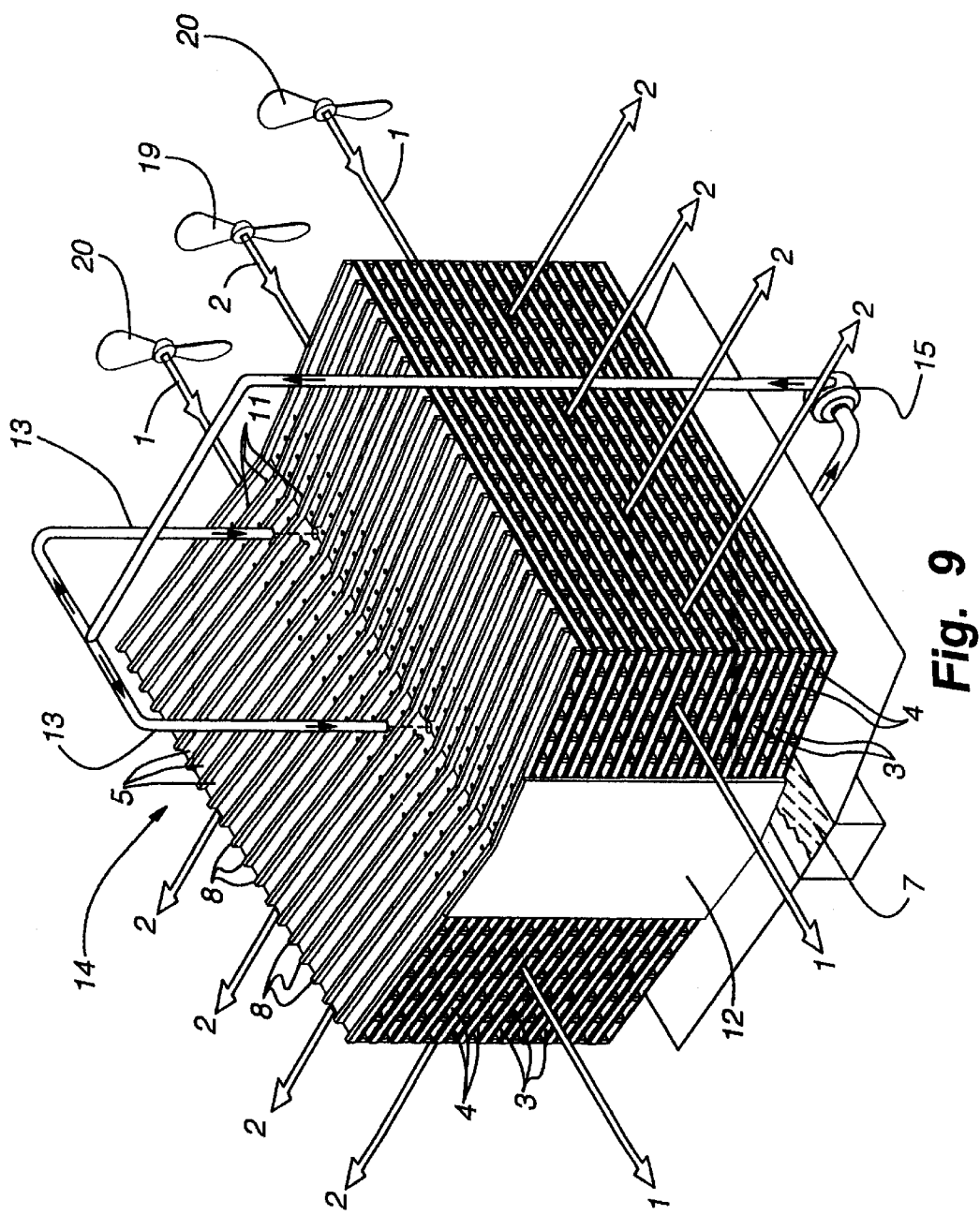
FIG. 9 is a partially exploded perspective view of an assembly of the invention, including schematic representations of gas flow and fluid flow with upward angled wings of a core.

FIG. 9 is a partially exploded perspective views of another embodiment of the invention, including schematic representations of gas flow, as viewed from two different angles.

Indirect evaporative cooler 14 is built up in approximately a box shape, although this shape may be optimized to suit conditions, as is well known in the art. A plurality of plates 6 forms the stack. Each of plates 6 has a wet side 10 and a dry side 9, although for the sake of clarity these are referenced for only the topmost plate 6. Plates 6 are aligned in parallel and oriented with like sides facing, so wet sides 10 face wet sides 10 and dry sides 9 face other dry sides 9.

It is advantageous to provide plates 6 in which perforations 11 do not line up directly facing the perforations in adjacent plates. Instead, in the preferred embodiments of the invention, perforations 11 are offset from the perforations 11 in the next plate 6. This helps to reduce the pressure drop across the evaporative cooler 14, thus reducing the energy required by the device and increasing efficiency. In addition this creates better distribution of air in the evaporative channel 5.

Cooler 14 also has water reservoir 17, pump 15, and feeder wicks 13. Water 7 is removed from water reservoir 17 by pump 15 and lifted to feeder wicks 13. A reservoir refill line 8 allows water reservoir 17 to be continuously refilled or refilled as desired.

Although spacing of the plates may be any amount for some gases or fluids, spacing of plates 6 is important to efficient use of the invention. If the spacing is properly selected, pressure drop of the gas streams passing through the invention is greatly reduced, providing either greater flow or the ability to use smaller or fewer fans or blowers. Experiment has shown that an inter-planer spacing of 1.5 to 3.5 millimeters is preferable, and spacing within the sub-ranges of 1.50 to 1.85 millimeters, 2.00 to 2.35 millimeters, 2.10 and 2.90 millimeters and 3.10 and 3.50 millimeters is more preferable. Without being bound by any particular theories, it is believed that at these spacings, standing waves are set up which reduce drag during the flow processes. It is also possible that at these spacings, turbulent, non-laminar flow is discouraged, which may also serve to reduce drag and pressure drop in this particular process. The proper spacing may be maintained by separate structural elements (not shown) or may advantageously be provided by the channel guides 8, which may be provided ribs or corrugations of plate 6, or by other means.

Feeder wicks 13 comprise tubes having a wick material covering at least a portion of the outside of the tube. Holes through the tube allow water 7 within the tube to reach and wet the exterior wick material, which is in contact with the wick material on wet sides 10. Water 7 flows out through the holes into the exterior wick material. From there it, may transpire from the wick material of the feeder wick to the wick material 7 of wet sides 10 and so across such portion of wet side 10 as is covered by wick material 7.

Product fluid stream 1 enters channels 3, while working air stream 2 enters channels 4, both on the dry sides 10 of plates 6. Working air stream passes through perforations 11 into wet side channels 5, functioning as previously described cooling plates 6. Note that for the sake of clarity, only four working air streams are shown exiting the cooler 14 and only one entering it, but there may be any number, and they may (and in this preferred embodiment do) exit from both sides of cooler 14.

Channel guides serve several functions. In addition to separating air streams 1 and 2, they act to subdivide air streams 1 and 2 further, thus creating better temperature distribution in the invention, creating channels having cooler product air 1 near the center of plates 6, help to insure standing wave flow or laminar flow, thus reducing the pressure drop across the device, and help to insulate the parallel subdivisions of air streams 1 and 2, thus preventing parallel heat transfer. Finally, channel guides 8 also serve as structural members to support the stack and separate plates 6 by the desired distance.

Block 12 (visible in FIGS. 8 and 9) prevents working air 2 from leaving the device via channels 4, thus forcing it to flow through wet channels 5. Stated differently, the outlet for wet channels 5 will always be downstream of the perforations. As stated previously, in alternative embodiments, some product air may also be blocked/diverted or some working air allowed to leave as product air in accordance with requirements and conditions.

As previously discussed, the amount of pre-cooling which air stream 2 undergoes, is in part determined by selection of perforations and channel sizing. Also as discussed previously, the material of plate 6 provides poor lateral heat transfer, thus in turn providing a temperature differential or gradient laterally across plate 6. Channel selection dampers (not shown) may advantageously be used to select which of the subdivisions of air streams 1 and/or 2 are used for conditioning, thus allowing a greater degree of cooling than otherwise, as well as providing for flexible control of the output gas temperature, humidity and quantity.

Fans or equivalent blower devices are schematically represented as 19 and 20, but the invention is subject to alternative embodiments of the fan arrangement. For example, one fan as forced draft may be used to provide both working and product air streams 1 and 2. In addition, a forced draft fan has advantages over an induced draft. Due to the evaporative process used by the device, the parasitic heat added by the fan motor to airstreams 1 and 2 is efficiently used to further evaporate water 7 and thus the heat aids in its own removal, resulting in little difference to the temperature of final product air stream 1. A forced draft fan provides air to both the working air and product air channels according to the pressure drop through each and any outside dampers that may be used. Finally, since the working and product air emerge at different outlets, two fans are required to induce two drafts, while only one fan is required to force both drafts.

Stack 14 may be enclosed in a housing (not shown), which housing may further direct and control airflow, as well as enhancing the esthetics of the device. The housing may comprise inlets and outlets for the product and working air streams, and a damper to allow the direction of airflow to be controlled. For example, when the damper is in a first position, it may cause the cooler to operate normally, whereas when the damper is in a second position, it may cause the warmed, humidified working air to become the product air. This may be used in conjunction with recirculating air, as described above, to provide humidification and pre-warming of winter air.

As in previous embodiments, the indirect evaporative cooler 14 may be used in conjunction with recirculating air streams, desiccant wheels, corrugated plates, and treatment of the material of the plates, perforations and other details.

Note that the indirect evaporative cooler of the invention may also accomplish both direct and indirect evaporative cooling of the product air stream 1. A portion of the dry sides 9 may be wetted, in a manner similar to the wick materials used on wet sides 10 or in a different manner, so as to cause further cooling of the product air stream. This wet portion of the dry sides may advantageously be placed downstream of the dry portion of the dry sides, so that prior to being humidified in the direct evaporation cooling process, the sensible temperature of the product air stream 1 is reduced as much as possible. One particular advantage of this ordering is that below approximately 65 degrees F., modest increases in humidity cause disproportionate reduction in air temperatures, in accordance with standard psychometric charts. In another embodiment of the invention, this wetted portion of the dry sides constitutes the final 1 to 25 percent of the surface area of the dry channels 3.

Figure 10:
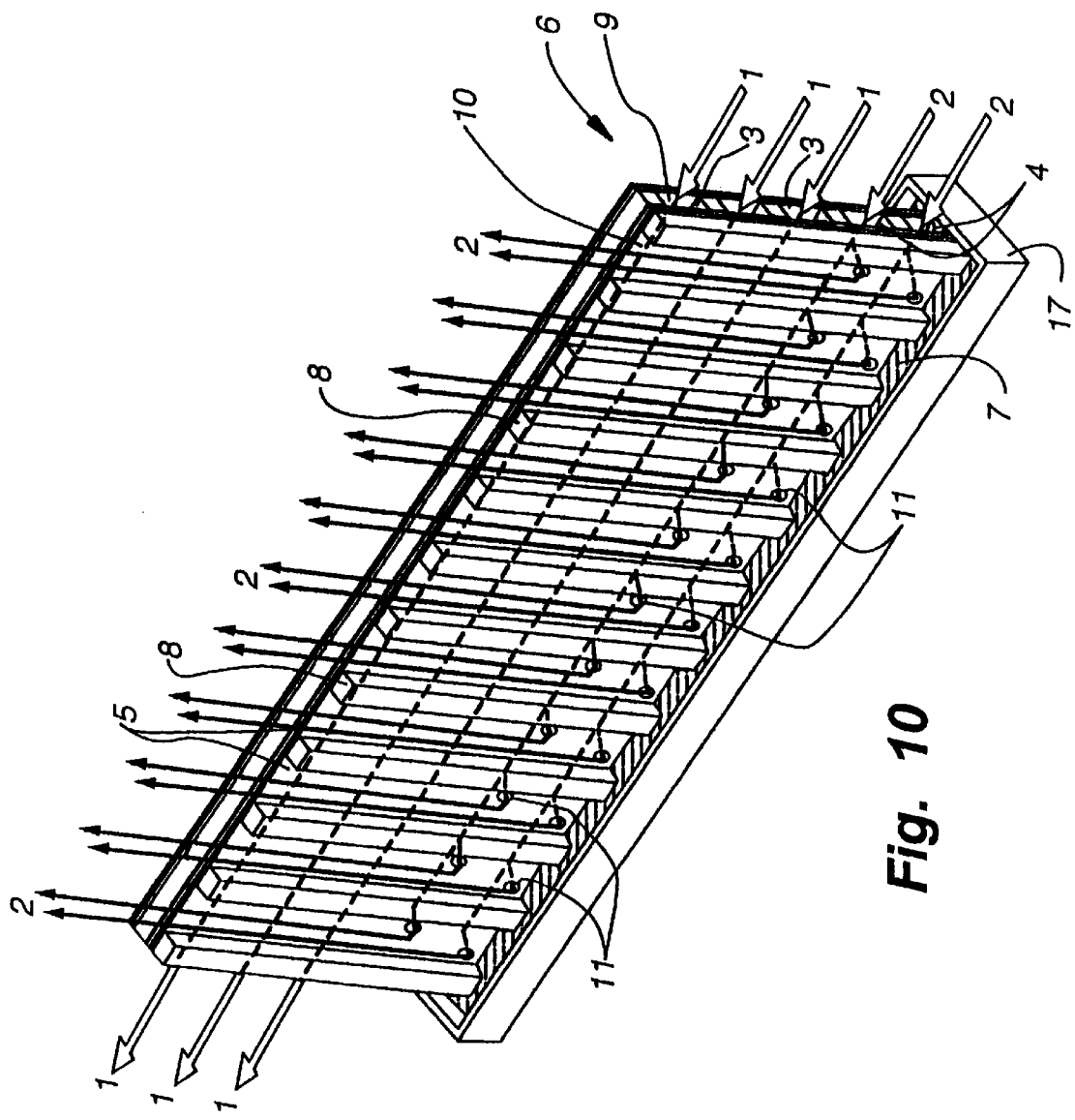
FIG. 10 is a partially exploded perspective view of an embodiment of the invention using a plate such as FIG. 1(d) with the liquid supplied to the wick material on the plates by a reservoir. There would be successive plates with dry dry and wet wet surfaces.

FIG. 10 is a three dimensional perspective and schematic representation of another embodiment of the invention, showing gas flow and a reservoir of water.

Evaporative cooler 6 has dry sides, wet sides 10, product air stream 1 and working air stream 2, channel guides 8, channels 3 and 4 and wet channels 5, as well as water reservoir 17. In this embodiment, there is no need for a water pump or feeder wicks because the wick material of wet sides 10 is directly placed in water reservoir 17. However, the width of the plates of cooler 6 is limited to the maximum wicking height of the wicking material unless the plates are sloped, as described earlier, which slope also allows more efficient wicking. This embodiment is also an example of an indirect evaporative cooler of the invention, which uses exhaust from only one side of the plates.

In FIG. 8, the two wings of the cores extend out and upward from the center. In the center, as depicted is a feeder wick plate that communicates liquid used for the evaporative cooling in the wet channels to the wick material layers of the core.

Figure 11:
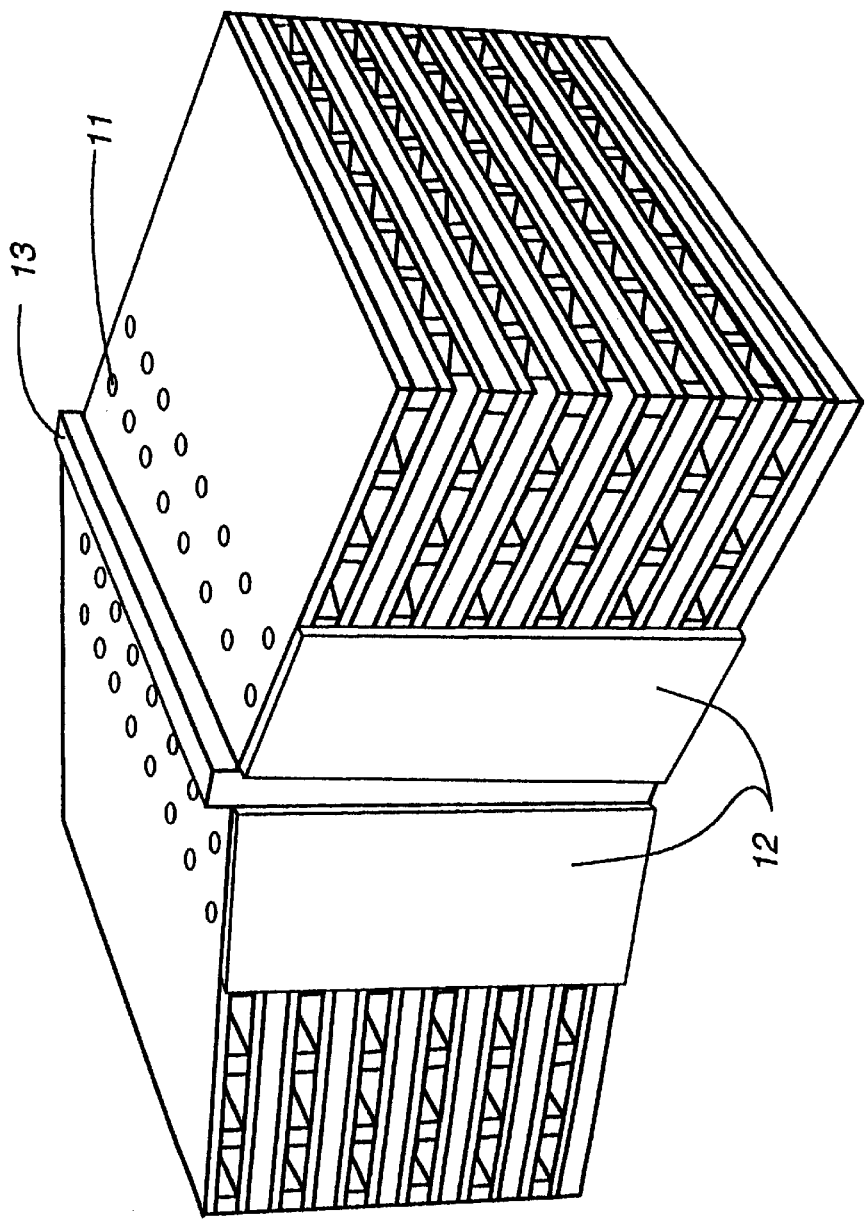
FIG. 11 is a perspective view of a two part core with a center feeder wick plate between the two wings with the wings angled downward from the center and perforations in area of each layer nearest the center wick.

In FIG. 8, the wings are angled upward, between approximately 0 degrees and +10 degrees. An alternate is illustrated in FIG. 11, where the wings are angled downward from the center, also within the approximate range of slope of 0 degrees to −10 degrees.

The selection of upward or downward sloping wings will also include a selection of wick material in the wet surfaces of the layers, so that the liquid migrates over the entire surface of the wick material surface of each plate.

The advantage of the downward slope is that the liquid will more readily reach the edges due to the added impetus of gravity. This will aid in the reduction in the scale build up on the edges that can occur with liquids that have mineral content.

The added assistance of gravity (or downward sloping wings) is that it allows more length of the wings to be wetted from the center feeder wick and it will be accomplished faster.

The potential of excess water being collected at the outer edges of the wings in a downward sloping core, is that liquid droplets will form. Also when excess liquid is being cooled, unnecessary cooling of the liquid diminishes the efficiency of the evaporative cooler. To minimize the excess water, the wicking material on the layers will be less porous than the feeder wick.

The upward angled wings, FIG. 8, will not have the excess water collecting at the edges of the layers. The more likely issue is not enough water reached the outer edges, resulting in lost cooling potential and the build up of minerals at the dry edges.

Figure 12:
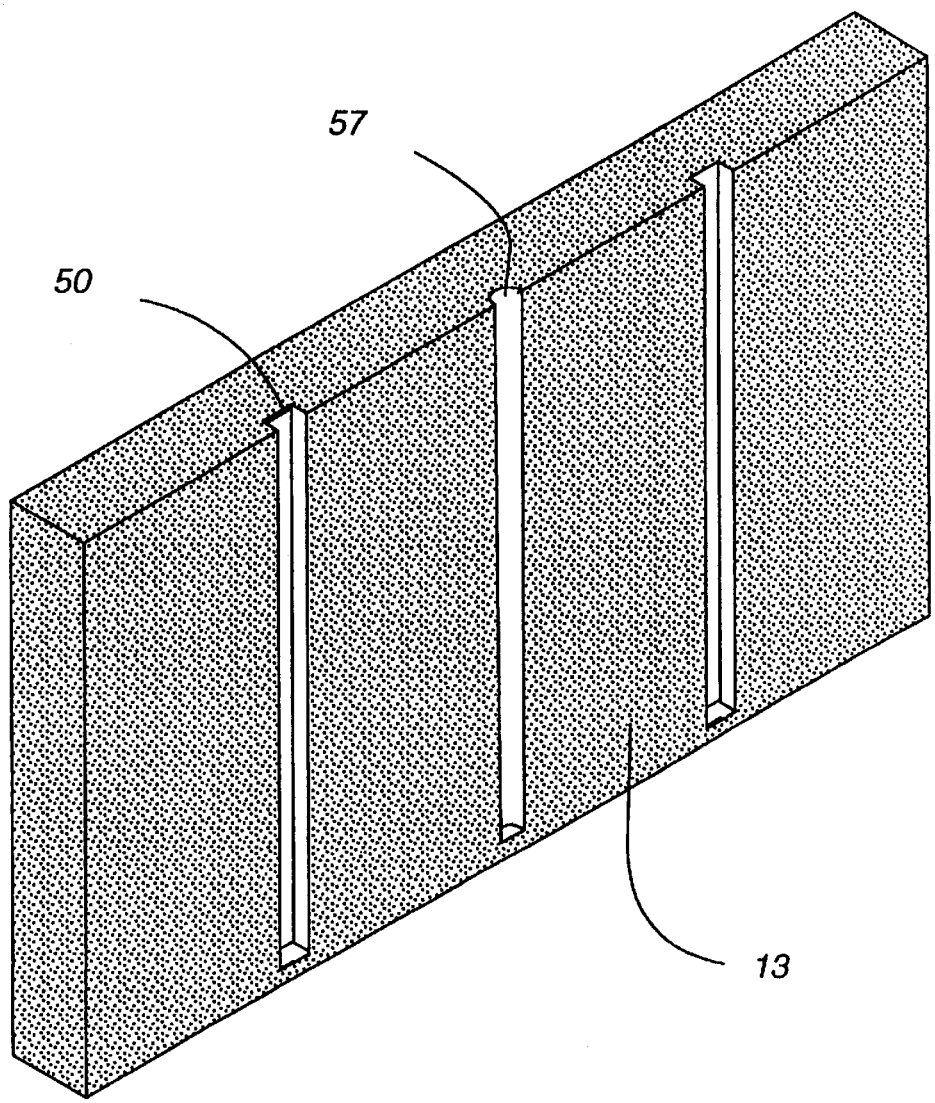
FIG. 12 is an embodiment of the feeder wick plate used in FIG. 8 with grooves that run some or all of the way from the highest to the lowest point to speed liquid transfer to the bottom of the wick and to allow excess liquid to be drained.
Figure 13:
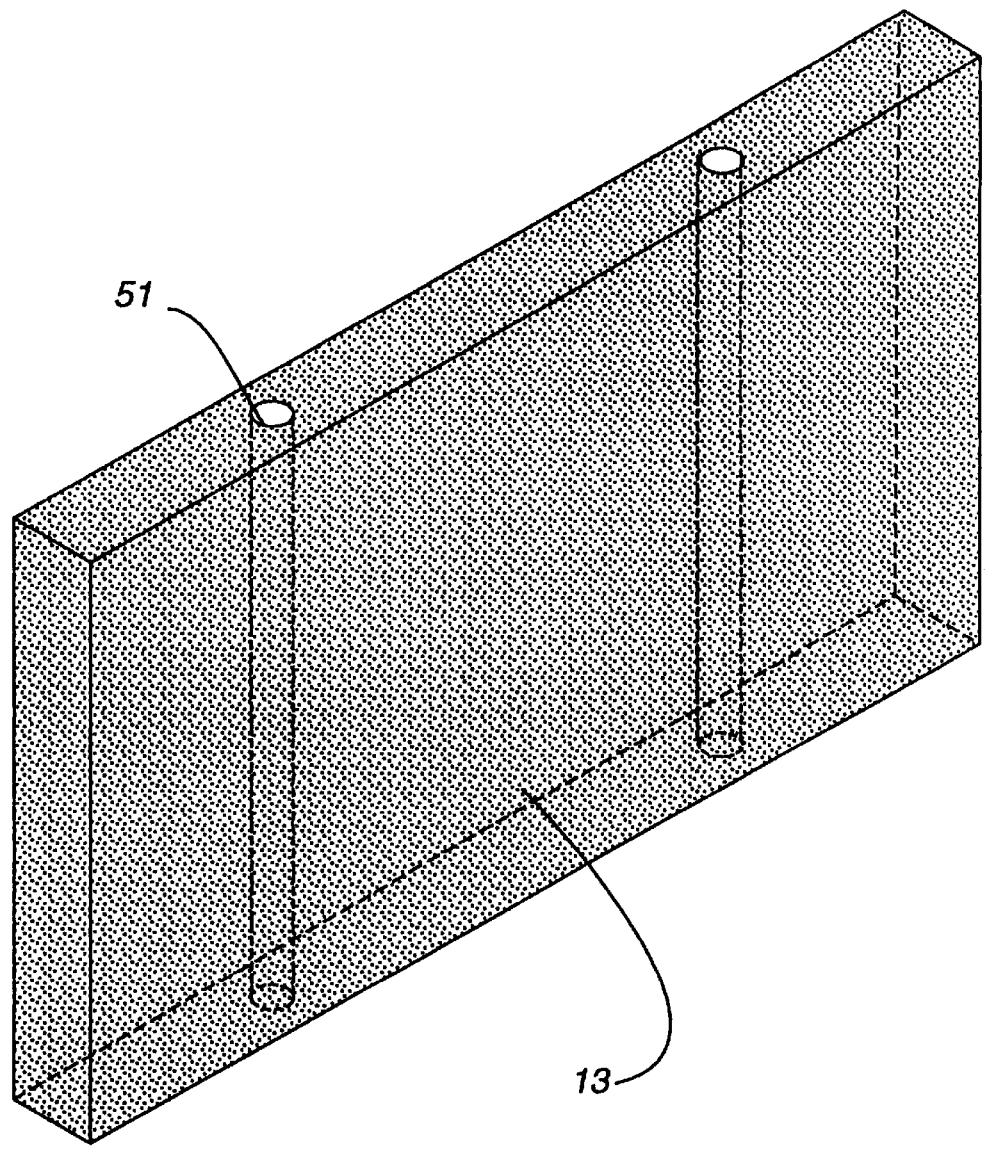
FIG. 13 is a second embodiment of the feeder wick plate with hole through the inner part of the feeder wick plate.
Figure 14:
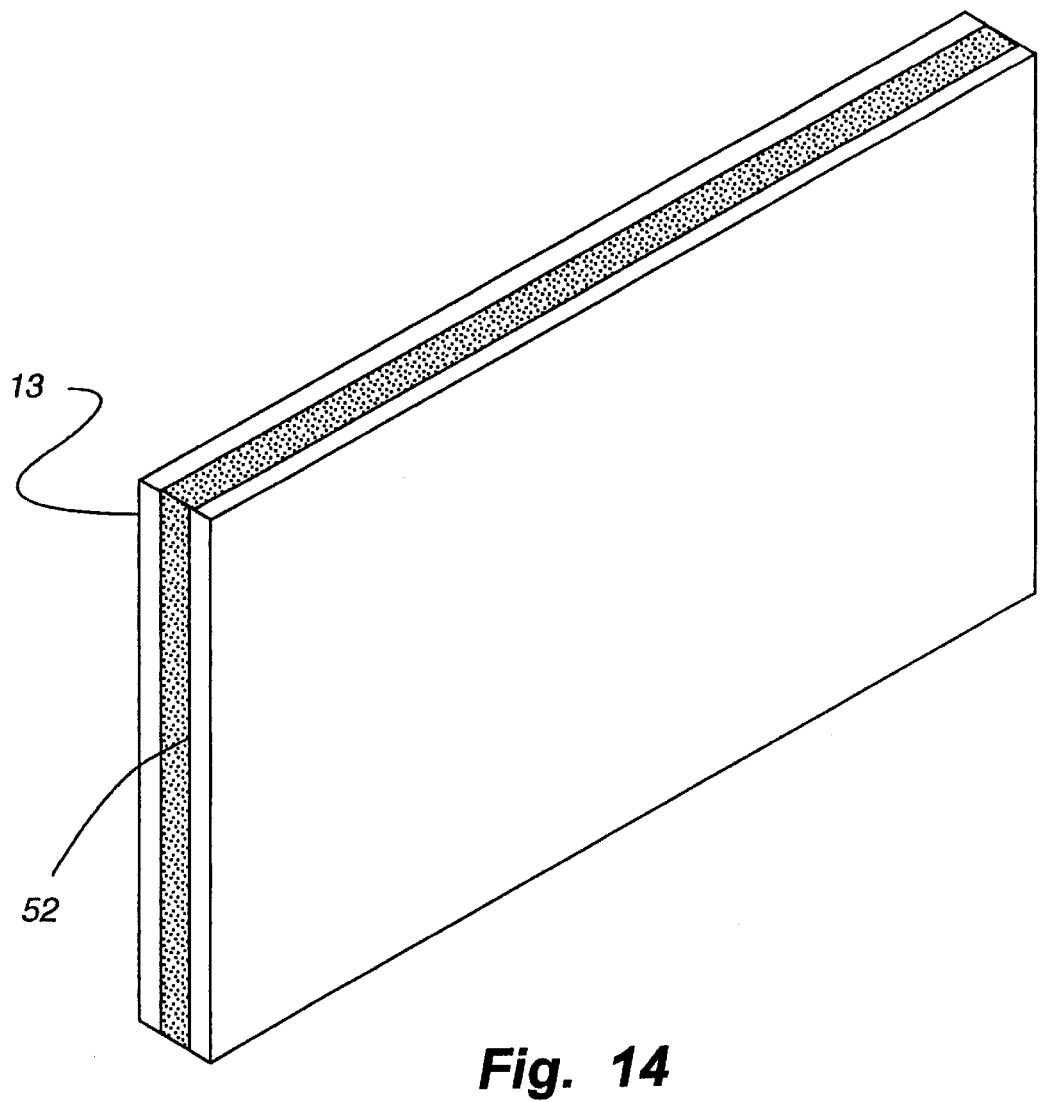
FIG. 14 is a third embodiment of a feeder wick plate comprised of a sandwich to aid quick distribution of liquid to the outer perimeters of the feeder wick plate and to aid drainage. The sandwich is comprised of materials with two different porosities the middle layer having greater porosity than the outer layer.

The embodiments of the feeder wick plates 13, shown in FIGS. 12, 13, and 14, are refinements of a solid feeder wick plate. The purpose of the channels or grooves 50, FIG. 12, the holes 51, FIG. 13, or the sandwich, FIG. 14, all are to enable quicker movement of liquid from the top, where liquid is introduced to the feeder wick plate, to the bottom and thus more quickly wet the core wick material. Alternate methods to accomplish the distribution aid may include rods 57 placed along the sides of the feeder wick.

The channels, holes and more porous core of these embodiments will allow liquid to move throughout the feeder wick plate and, thus, aid distribution of the evaporative liquid.

The channels, holes or cores may not extend all of the way to the bottom of the feeder wick plate, as this would allow the liquid to too easily pass through these passageways before wetting the feeder wick.

Figure 15:
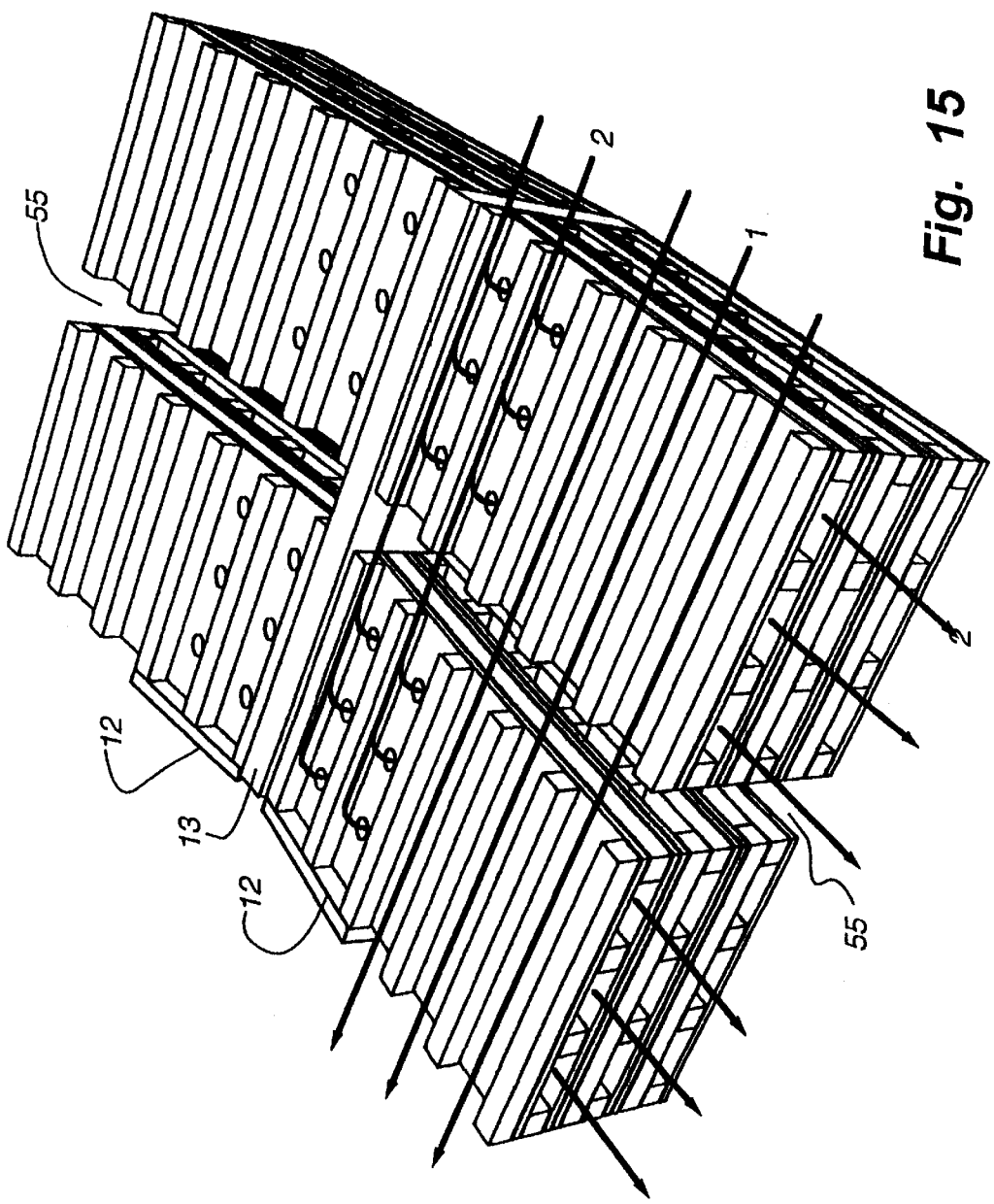
FIG. 15 is a perspective view of two cores similar to FIG. 8 with the air pathways shown and illustrating a separation gap between the two cores to aid in heat transfer rates by breaking up the paths into segments and thus break up large pathways which create boundary layers which in turn inhibit heat transfer.

FIG. 15 illustrates a set of core sections with a gap 55 between adjacent sections. This gap performs a function of breaking up the canalized air streams into discrete segments. This in turn reduces the build up of boundary layers in the channels, which prevents efficient heat transfer. Where the channels are small or the velocity is low, the fluid tends to be in laminar flow. In the boundary layer next to the plate in the dry channels the heat transfer rate is lower. This boundary layer is nil at the entrance of the plate and grows to some steady state amount with in the first few inches. Therefore the heat transfer rate is significantly greater at the entrance to any channel and reduces exponentially to some smaller steady state amount.

Figure 16:
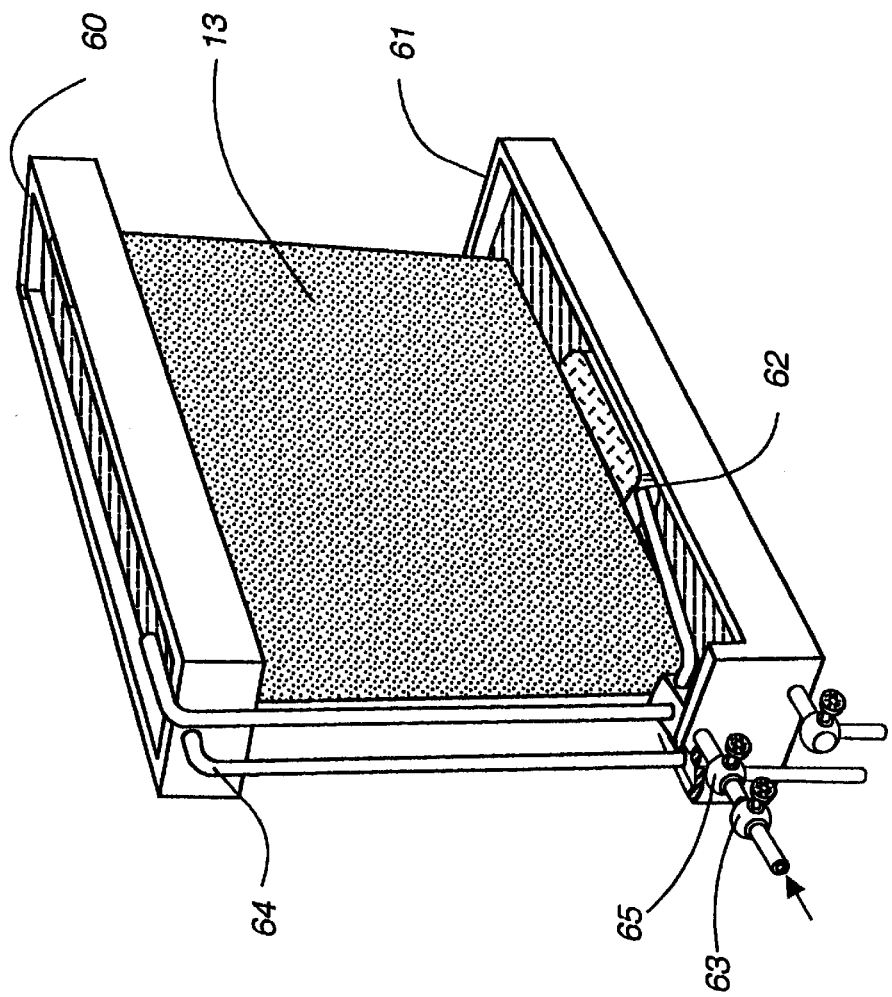
FIG. 16 is an assembly of a reservoir piping and valving in conjunction with a feeder wick plate usable in assembly such as FIGS. 8, 15 and other embodiments. The upper reservoir feeds the feeder wick plate. The lower reservoir by way of a float valve determines if the wick is short of liquid and thus having a lower reservoir level in the bottom reservoir, which then turns on the feeder valve to supply more liquid to the top reservoir.
Figure 17:
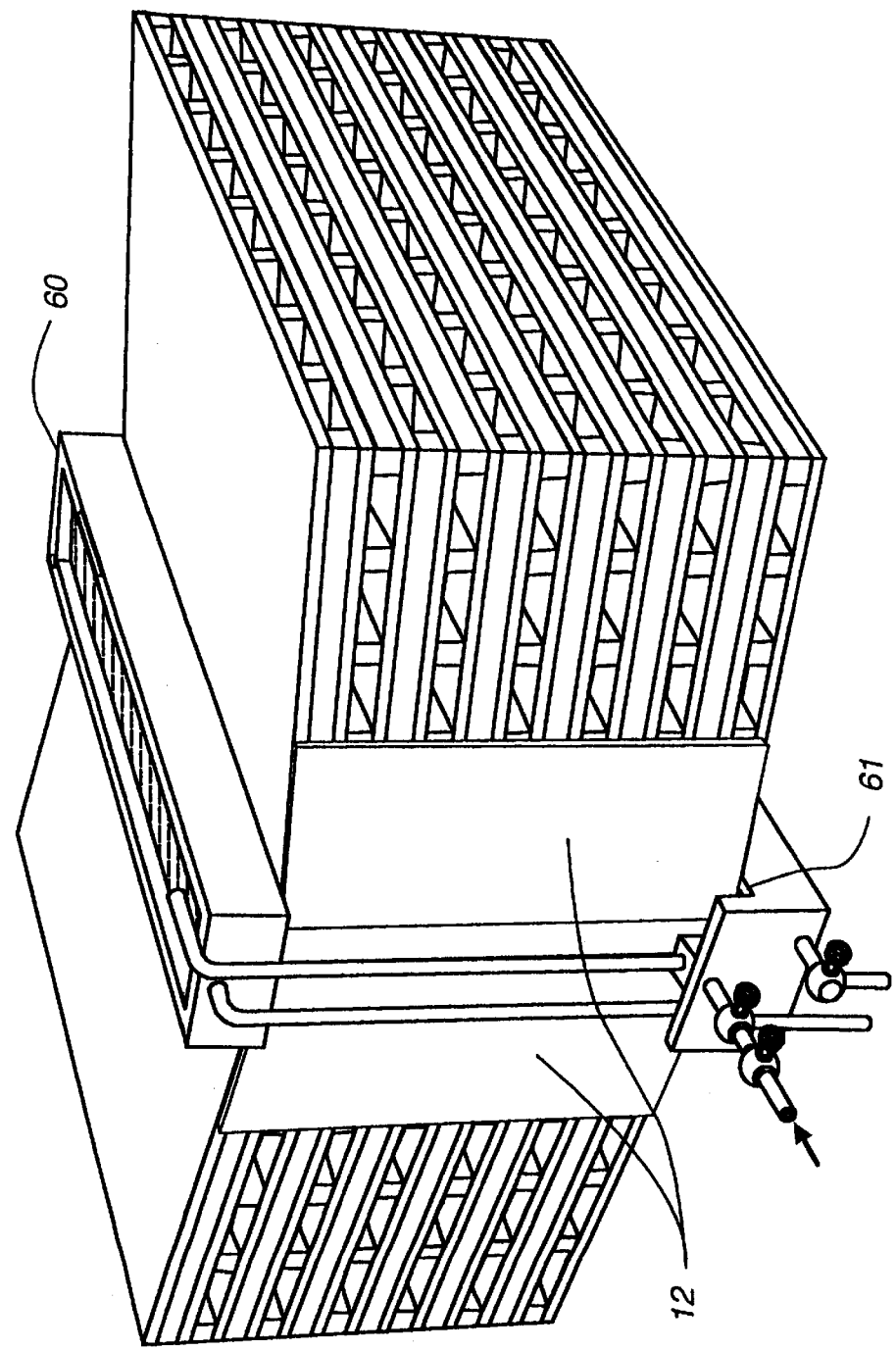
FIG. 17 shows the reservoir system of FIG. 16 incorporated with the core assembly of FIG. 8.

An embodiment of the reservoir system is shown in FIG. 16 and in FIG. 17 in conjunction with the cores and feeder wick plates.

The top reservoir 60 feeds liquid to the feeder wick plate. The top reservoir is fed by a valve and piping with the appropriate liquid. As the reservoir feeds the feeder wick, excess liquid passes to the lower reservoir 61.

A float valve 62 relies upon the level in the lower reservoir to activate the supply valve 63 for the upper reservoir.

As the wick takes liquid to the wick material on the layers of the core, the upper reservoir 60 is depleted. If there is more evaporate than excess liquid draining into the lower reservoir 61, the float 62 will be lower. As it gets lower it activates the supply valve 63 to add more liquid to the upper reservoir 60.

As there becomes an excess of liquid fed to the feeder wick plate 13, more than can evaporate, the excess collects in the bottom reservoir 61, which raised the float and in turn cuts off the supply valve to the upper reservoir. This system does require a continual bleeding off of water from the bottom reservoir such that it can sense the water entering the system. This bleed drain also helps to prevent mineral concentration.

In this way the evaporation rate determines the need to add or diminish the liquid to the feeder wick core.

Added features would include an over flow drain 64, cold turn off and drain system 65. A Thermostat may activate the supply of liquid to the reservoir in any commonly arranged systems.

Figure 18:
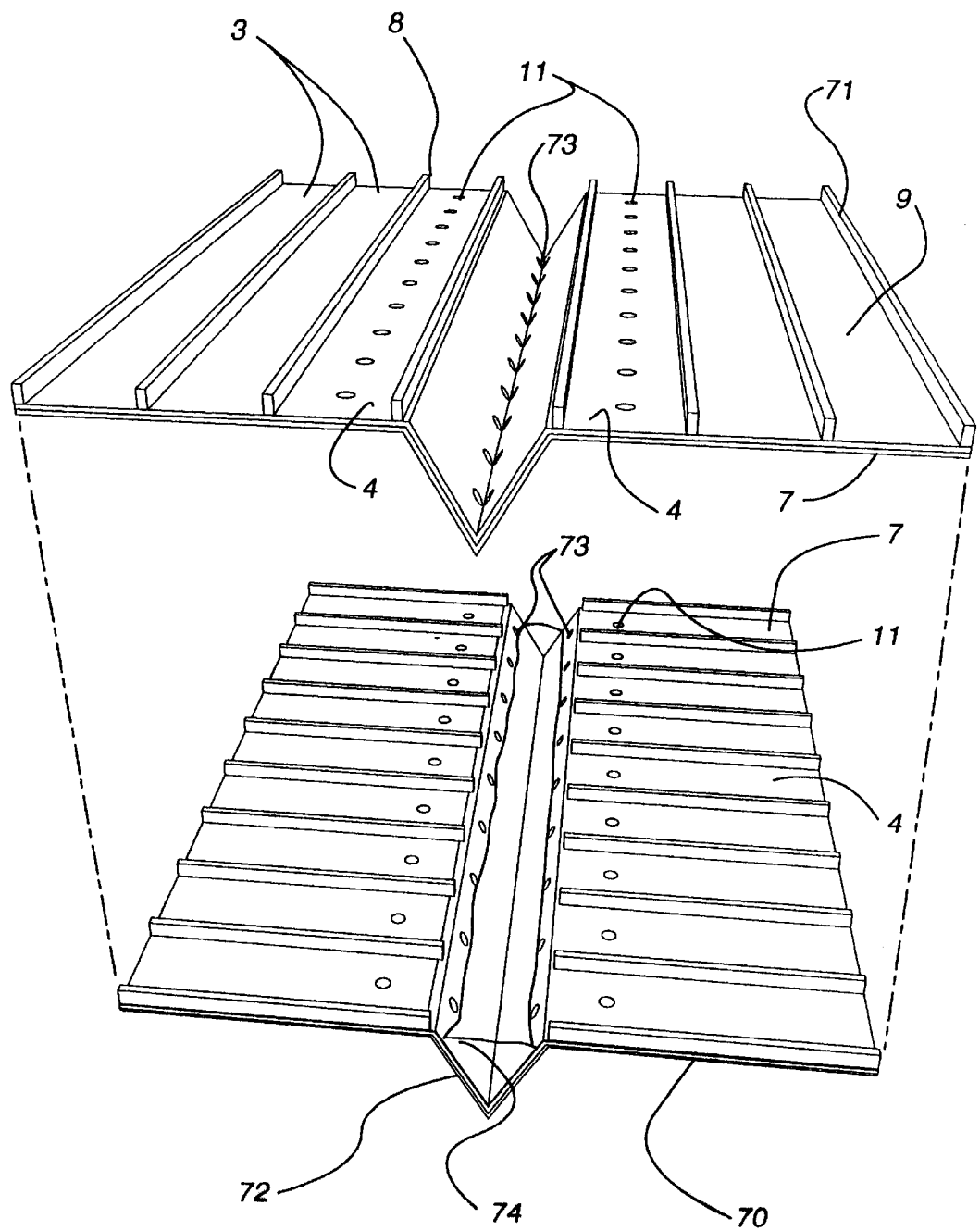
FIG. 18 is a perspective view of another embodiment of a Type 1 plate, wet side up, showing working channels, and gas perforations with a trough formed in the plate having liquid perforations for liquid to pass through to the next layer after it reaches a predetermined level in the trough (on the bottom of FIG. 18), and a second trough plate Type 2 similar to the Type 1 plate, but with the dry side up, with product and working channels and the liquid perforations with trough location at the bottom of the trough (on the top of FIG. 18).

FIG. 18 illustrates another embodiment of the heat exchanger plate, a Type 1 plate 70, with a trough 72 on the bottom and a Type 2 plate 71. The Type 1 and 2 plates perforations 11 for gas flow 2 are outside the formed trough. The trough 72 is used to hold and to distribute the liquid 1 used on the wet sides of the plate. In the Type 1 plate the wet side 10 is viewable. With the wick acting material 7 on this surface and the surface of the trough that is viewable.

The liquid perforations 73 in the trough area are for the liquid to pass through to the next layer. With the wet side wick material 7 is on the upper side, the liquid perforations 73 are on the sides of the trough 72. This allows a reservoir 74 of liquid to be kept at this layer, to allow the liquid to be wicked outward to the sides of the plate. By the liquid perforations 73 being on the sides, the reservoir 74 will be up to this level. For the next layer up (or Type 2 plates 71) with its wick layer on the underside, the similar trough 72 form will be partially submerged in the reservoir 74 liquid and thus, the wick material 7 on this layer will be fed the wetting liquid from this reservoir 74. Both opposing wet surfaces will get the liquid from this one reservoir.

On the wet side the working gas channels 4 angle toward the outer edges as in the other embodiments and receive working gas 2 from the dry side 9 through the gas perforations 11 as in the other embodiment. The flow of the working gas 2 helps to distribute the liquid outward on the wet side of the plate.

In Type 2 plates 71, the product channels 3 and the working channel 4 are segregated by channel guides 8. The liquid perforations 73 are located in the bottom of the trough to allow the liquid that comes from the plate reservoir above or from a feeder tube 75 to drain down to the reservoir below in the next lower plate.

Figure 19:
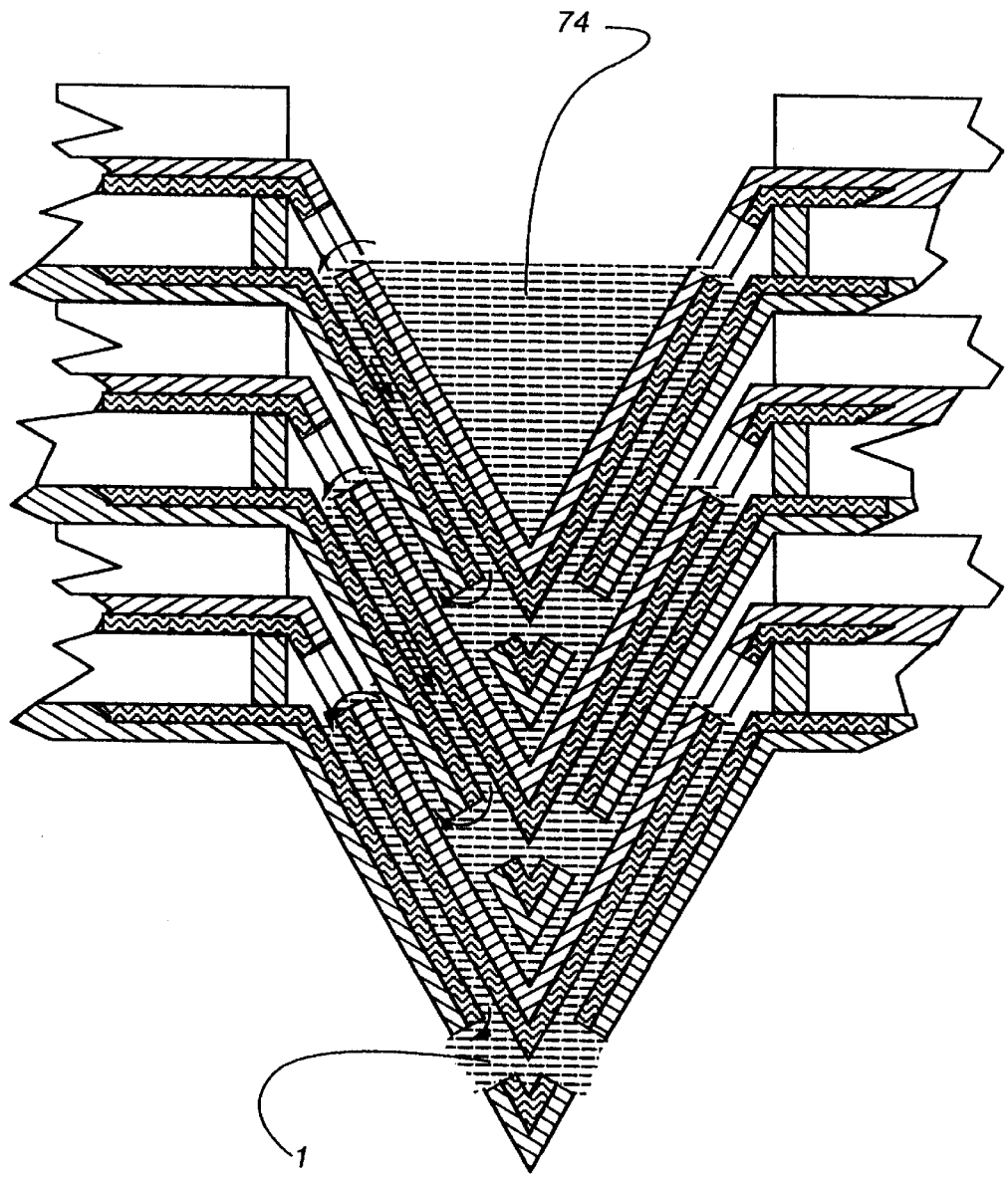
FIG. 19 is a perspective and schematic view of a stack of plates with a Type 1 plate, and a Type 2 plate, and a second Type 1 plate and a second Type 2 plate and a third Type 1 and a third Type 2 showing the path of liquid as it enters the top of the trough of the Type 2 plate from the plate above and exits the liquid perforations and drops to the trough of the next lower plate, a Type 1 plate where the liquid accumulates in a reservoir until the liquid reaches the level of the liquid perforation in the sides of the trough where it exits and goes to the trough of the next lower Type 2 plate and continues. The liquid thus cascades downward leaving a reservoir of liquid in the trough of each Type 1 plate.

When there are multiple plates, with wet sides opposed to form working or wet channels 4 and the obverse sides forming dry channels 3 the trough 72 forms are nested. The liquid 1, wherever it enters the stack will cascade downward collecting in each Type 1 trough, the liquid in the wet channel reservoir 74. This flow is illustrated in FIG. 19.

Figure 20:
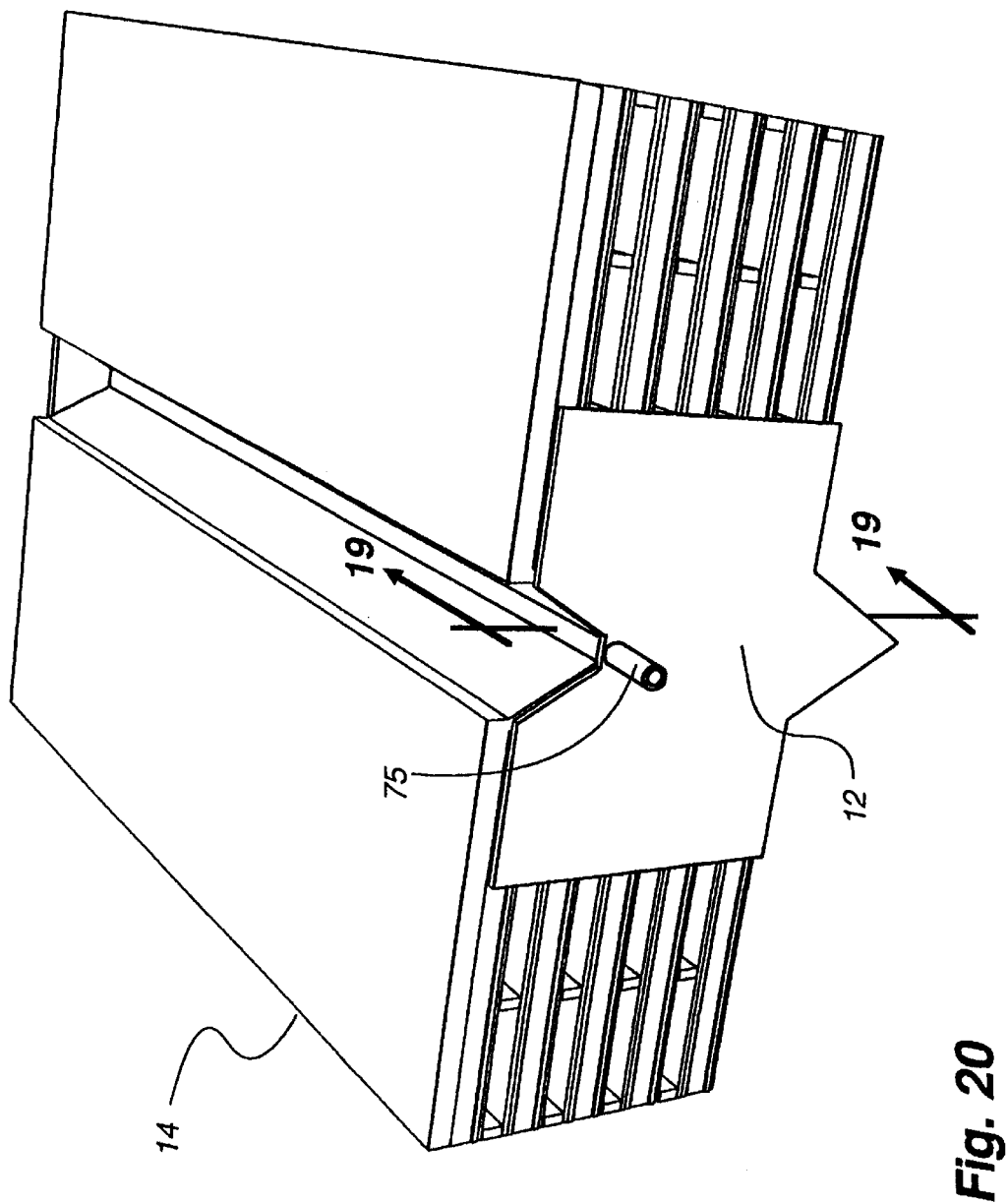
FIG. 20 is a perspective and schematic view of a stack of Type 1 and Type 2 plates with a liquid feeder tube to supply liquid to the top trough of this stack, and having a top plate and a working air seal to control the air and liquid passage to the correct pathway.

FIG. 20 shows a more complete stack 14 with a feeder tube 75 to distribute liquid 1 to the top trough. On the ends, as in FIG. 8, is a barrier 12 to seal the working gas passage 4 so as to direct the working gas 2 through the gas perforation 11 into the adjoining wet working channels 4. The product channels 3, as in FIG. 18 are segregated from the working gas channels 4 for the dry side of the plates.

Figure 21:
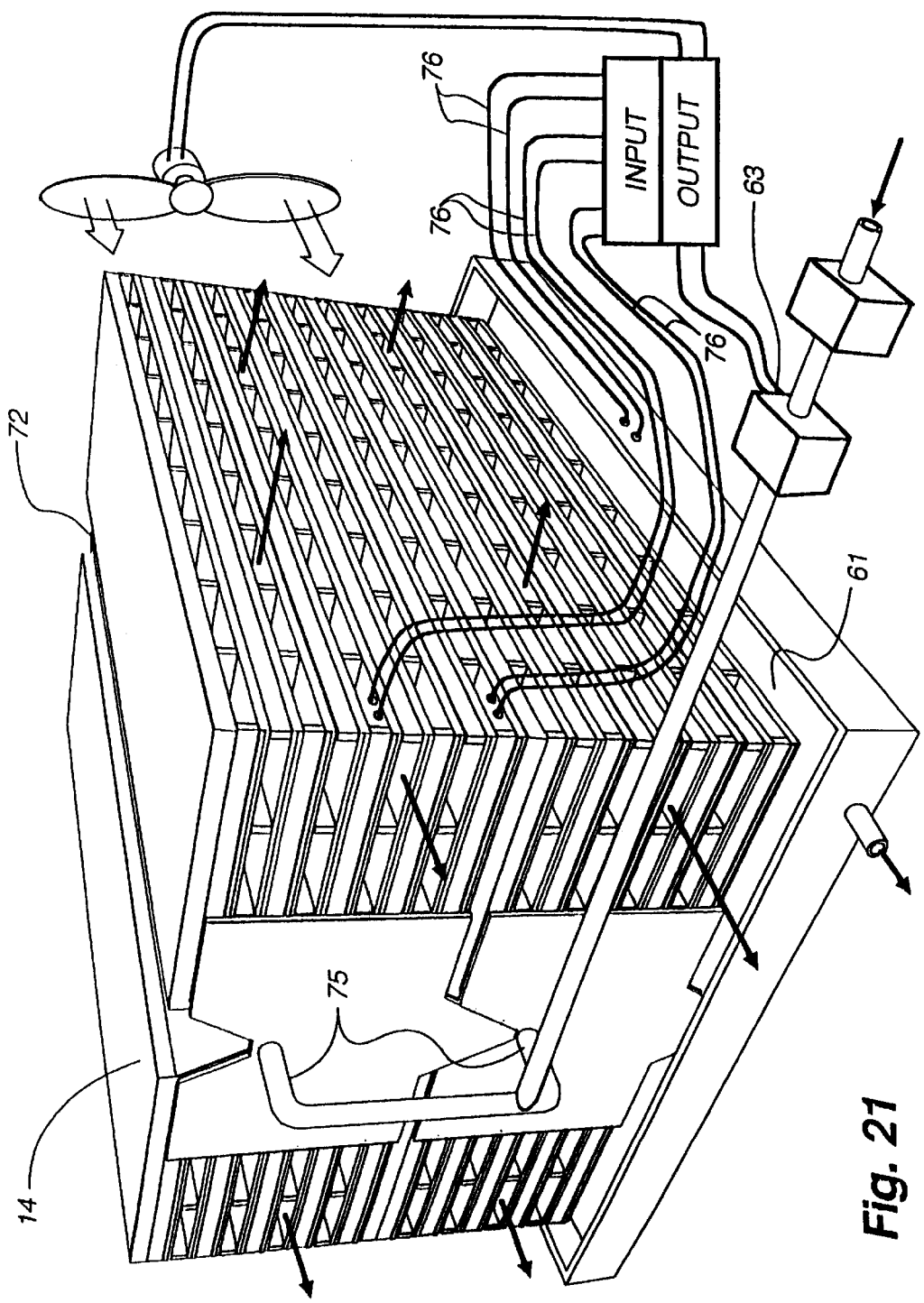
FIG. 21 is a perspective and schematic view of a stack of Type 1and Type 2 plates, as in FIG. 20, with liquid supply tubes at more than one level and a bottom reservoir to collect liquid with a monitoring device to detect whether liquid needs to be added to the stack because of usage rates.

FIG. 21 is, similar to FIG. 20 and illustrates a stack 14 using the trough 72 with two feeder tubes 75, one at the top and one at a middle level. This allows for priming of the liquid reservoirs 74 for a quick startup. This may be accomplished in other ways known in the art, including multiple entry points. The sensors 76 illustrate how the liquid level is detected in the bottom reservoir 61. If it is too dry, the controller opens the supply valve 63 to supply more liquid to the liquid feeder tubes 75. Conversely, if the bottom reservoir 61 is too wet, the flow to the feeder tubes is cut back. The usage of the liquid by the wet channels in evaporation diminishes the flow of liquid which minimizes the liquid that gets to the bottom reservoir 61. When this situation occurs the sensor 76 detects the low level and signals for more liquid. Sensors 76 could be placed in wet channels or at places in the stack 14 or in trough reservoirs 74 as understood by those knowledgeable in the art.

The use of plastic, cellulose or other pliable materials may not be suitable for the heat transfer membranes in some applications where refrigerates or steam are condensed with pressures and indirect cooling. The channels for the product fluid may need to be a metal such as aluminum or other suitable stiff and walled structures, such as tubes with the walls being the heat exchange surface.

By pre-condensing and cooling refrigerates, with indirect cooling in cores such as the disclosed invention, efficiencies of less pressure are needed to compress the gaseous refrigerant during its cycles can save heat build up and power usage.

The use of cores as disclosed is more efficient and less costly than cooling tower and as such, capable of by incorporation into residential systems.

The invention and the embodiments described herein are susceptible to many equivalents, alterations and additions without departing from the scope of the invention. This description in no way limits that scope, which is determined by the following claims.

We claim:

1. A plate for heat exchange and indirect evaporative cooling of at least one fluid stream, the plate comprising:
   a) a dry side having low permeability to an evaporative liquid;
   b) a wet side with its surface wet by an evaporative liquid;
   c) the dry side of the plate separated by first channels into two sections, a working stream section and a product stream section with at least one passageway through the plate in the working stream section to allow the working gas on the dry side to transfer to the wet side of the plate;
   d) a trough shape formed in a portion of the plate; and
   e) the trough portion having liquid perforations.

2. The plate of claim 1, further comprising second channels on the wet side of the plate oriented in a direction other than parallel to the fluid flow on the dry side.

3. The plate of claim 2, wherein one or more first channels are oriented at an angle to the one or more second channels, whereby the direction of flow of fluids across the dry side of the plate is substantially perpendicular to the direction of flow of gases across the wet side of the plate.

4. The plate of claim 3, wherein the plate comprises a material having a low rate of heat transfer, but with a thin cross-section that allows heat to be readily transferred from the dry side to the wet side, even with the low rate of heat transfer of the material.

5. The plate of claim 1, wherein the channel aids laminar flow across at least one side of the plate.

6. The plate of claim 1, wherein the plate further comprises a plurality of ribs extending parallel to the direction of gas flow across the plate, and further wherein the ribs provide the channels.

7. The plate of claim 1, wherein the channels are provided by corrugations of the plate.

8. The plate of claim 1, wherein the perforation is one of the shapes belonging to the group consisting of: round and polygonal having rounded corners.

9. The plate of claim 1, wherein at least a portion of the plate is oriented so as to slope at an angle of from −10 to +10 degrees from the horizontal.

10. The plate of claim 9, further comprising a reservoir of water, wherein the lowest edge of the plate is in contact with the water.

11. The plate of claim 1 wherein the top side has the a wick material and the liquid perforations are on the sides of the trough near the top.

12. The plate of claim 11 wherein the wick material is on the bottom side and the liquid perforations are near the bottom of the trough.

13. An indirect evaporative cooler comprising:
   a) a plate having dry and wet sides, the wet side being at least partially wet by an evaporative liquid, and further having two or more first channels across the dry side of the plate and one or more second channels across the wet side of the plate; and
   b) a product flow stream and a working gas stream separately flowing across the dry side and thereby transferring heat to the plate;
   c) a passageway through the plate in the area of the working stream on the dry side, the working stream flowing through the perforation from the dry side to the wet side and further flowing across the wet side;
   d) the plate transfers heat to the working gas stream on the wet side by direct evaporative cooling and thereby cooling the plate and the product flow and working gas streams flowing on the dry side; and
   e) a trough formed in a portion of the plate to hold and transfer the evaporative liquid to the wet side of the plate.

14. The indirect evaporative cooler of claim 13, further comprising:
   a) a second plate having first and second sides, the first of a dry side and the second side of the second plate being partially wet by an evaporative liquid, and further having two or more first channels across the dry side of the second plate and one or more second channels across the wet side of the second plate, and having a passageway through the second plate in the area of the working gas stream on the dry side;

b) aligned in parallel with the first plate, spaced apart therefrom, and oriented so as to have wet sides of the first and second plates opposing, and further wherein the working gas stream from the dry side of both the first and second plate flow through to the space separating the plates on the wet sides and the trough portions are oriented and nested with each other; and c) the product fluid passes across and is cooled on the dry sides of both the first and second plates.

15. The indirect evaporative cooler of claim 14, wherein the spacing between the plates is chosen to minimize the pressure drop of the gases flowing between the plates.

16. The indirect evaporative cooler of claim 15, wherein the spacing between the plates is further chosen to be between 1.5 and 3.5 millimeters.

17. The indirect evaporative cooler of claim 16, wherein the spacing between the plates is further chosen to be in one of the ranges in the group consisting of: 1.50 to 1.85 millimeters, 2.00 to 2.35 millimeters, 2.10 and 2.90 millimeters and 3.10 and 3.50 millimeters.

18. The indirect evaporative cooler of claim 14, wherein at least one passageway through each plate is offset from the passageways through the other plate.

19. The indirect evaporative cooler of claim 14, wherein one or more channels on the dry side are oriented at an angle to one or more channels on the wet side, whereby the direction of flow of fluids across the dry sides of the plates is substantially perpendicular to the direction of flow of gases across the wet side of the plates.

20. The indirect evaporative cooler of claim 14, wherein the product stream and the working stream are dehumidified prior to flowing across the dry sides of the plates.

21. The indirect evaporative cooler of claim 14, wherein at least one of the streams, the product stream or the working stream are passed through a desiccant dehumidifier prior to flowing across the plates.

22. The indirect evaporative cooler of claim 14, wherein the product stream is recirculated from the space to be cooled to be reused as the working stream and/or the product stream.

23. The indirect evaporative cooler of claim 14, further comprising:

a) a barrier dimensioned and configured to prevent the working stream from exiting the indirect evaporative cooler prior to passing through the perforations.

24. The indirect evaporative cooler of claim 14, wherein the channels comprise a plurality of ribs extending parallel to the direction of fluid flow across the sides of the plates and the opposing surfaces of adjoining plates.

25. The indirect evaporative cooler of claim 14, wherein the channels are provided by corrugations of the plates.

26. The indirect evaporative cooler of claim 14, usable in either cooling a space or assisting in warming and humidifying the space, further comprising:

a) a cycle control damper having first and second positions such that when the cycle control damper is in the first position, the working gas stream is expelled into the atmosphere and the product stream is directed to cooling the space, and when the cycle control damper is in the second position, the product stream is expelled into the atmosphere and the working stream is directed to warm and humidify the space.

27. The indirect evaporative cooler of claim 14, further having at least one fan arranged so as to aid the motion of the product fluid and working gas streams.

28. A method of indirect evaporative cooling comprised of the following steps:

a) having a heat transfer surface;

b) wetting one portion of the heat transfer surface with an evaporative liquid that is held temporarily in a trough formed in the heat transfer surface;

c) having gas pass through the heat transfer surface from the dry portion to the wet portion;

d) passing a product fluid stream across the dry portion of the heat transfer surface to be cooled and used;

e) passing a working stream across the dry portion of the heat transfer surface where there are passages;

f) the working stream flowing through the passages in the heat transfer surface to the wet portion of the heat transfer surface;

g) cooling of the heat transfer surface by evaporation of the evaporative liquid into the working stream on the wet portion of the heat transfer surface; and h) cooling the product stream and working stream by contact with the cooled heat transfer surface in the dry portion.

29. The method of claim 28 where the guides on the dry side run parallel to the side of the plate with the passages.

30. The method of claim 28 where the guides on the wet side run at a direction other than parallel to the guides on the dry side.

31. An improved method to cool a fluid where it is comprised of the following steps:

a) having a plate for the heat transfer surface;

b) using two or more plates;

c) having adjacent plates with their opposed surfaces being of the same type, such as both wet surfaces, thereby forming a spacing between the adjacent plates;

d) having guides between adjacent plates to guide the fluid of the product stream and working stream in desired directions;

e) having the passages in all of the plates being in the same area;

f) having the guides in the dry space between adjacent plates guide the product stream separate from the working stream;

g) having the guides in the wet space between adjacent plates guide the working stream after it has entered the wet space in a direction other than parallel to the direction of the product stream yielding cool fluid of the product stream without any addition of humidity; and h) having the trough areas nested with each other and holding the evaporative liquid temporarily to wet the wet sides of the plates.

32. The method of claim 31 where the liquid for the wet surfaces is distributed by a wicking layer on the wet side of the plates.

33. The method of claim 31 where the plate has a layer on the dry side that is impermeable to the evaporative liquid.

34. The method of claim 31 where the wick layer of the plates is furnished evaporative liquid by liquid in the trough reservoirs.

35. The method of claim 31 where the trough reservoirs are furnished evaporative liquid and the liquid that is not taken by the wick material exits the trough through liquid perforations.

36. The method of claim 35 where the reservoir wets the wick material on two adjacent plates.

37. The method of claim 35 where there is a bottom reservoir.

38. The method of claim 35 where there is a means to sense whether more liquid is needed for the wick material.

39. The method of claim 38 where the means is a float valve in a reservoir.

* * * * *